United States Patent [19]
Nagano et al.

[11] Patent Number: 6,155,364
[45] Date of Patent: Dec. 5, 2000

[54] HYBRID DRIVE SYSTEM WHEREIN PLANETARY GEAR MECHANISM IS DISPOSED RADIALLY INWARDLY OF STATOR COIL OF MOTOR/GENERATOR

[75] Inventors: Shuji Nagano; Kunio Morisawa, both of Toyota; Hideaki Matsui, Miyoshi-cho; Ryuji Ibaraki, Toyota, all of Japan

[73] Assignee: Toyota Jidosha Kabushiki Kaisha, Toyota, Japan

[21] Appl. No.: 08/801,299

[22] Filed: Feb. 18, 1997

[30] Foreign Application Priority Data

Feb. 21, 1996 [JP] Japan .................................... 8-033578
Feb. 29, 1996 [JP] Japan .................................... 8-042842

[51] Int. Cl.[7] .................................................... B60K 6/02
[52] U.S. Cl. ........................ 180/65.2; 180/65.6; 475/151
[58] Field of Search ................................ 180/65.2, 65.3, 180/65.4, 65.6; 475/125, 151, 153, 149; 477/3

[56] References Cited

U.S. PATENT DOCUMENTS

| | | | |
|---|---|---|---|
| 5,427,196 | 6/1995 | Yamaguchi et al. | 180/65.2 |
| 5,489,001 | 2/1996 | Yang | 180/65.2 |
| 5,513,719 | 5/1996 | Moroto et al. | 180/65.4 |
| 5,558,595 | 9/1996 | Schmidt at al. | 477/3 |
| 5,571,058 | 11/1996 | Schmidt | 475/5 |
| 5,577,973 | 11/1996 | Schmidt . | |
| 5,603,671 | 2/1997 | Schmidt . | |
| 5,643,119 | 7/1997 | Yamaguchi et al. | 475/5 |
| 5,759,128 | 6/1998 | Mizutani et al. | 425/149 |
| 5,899,286 | 5/1999 | Yamaguchi | 180/65.3 |

FOREIGN PATENT DOCUMENTS

| | | |
|---|---|---|
| 0 410 451 A2 | 1/1991 | European Pat. Off. . |
| 0 528 412 A1 | 2/1993 | European Pat. Off. . |
| 7-317848 | 2/1995 | European Pat. Off. . |
| 0 751 025 A1 | 1/1997 | European Pat. Off. . |
| 0 773 127 A2 | 5/1997 | European Pat. Off. . |
| 0 775 607 A1 | 5/1997 | European Pat. Off. . |
| 0 776 779 A2 | 6/1997 | European Pat. Off. . |
| 43 42 735 A1 | 6/1995 | Germany . |
| 6-328950 | 11/1994 | Japan . |
| 6-328951 | 11/1994 | Japan . |
| 95208 | 3/1995 | Japan . |

OTHER PUBLICATIONS

Publication No. 95208, Mar. 31, 1995, Jidosha Gijyutsu Jireisyu, Intellectual Proprty Group, Japan Automobile Industry Association, p. 52.–

*Primary Examiner*—J. J. Swann
*Assistant Examiner*—David R. Dunn
*Attorney, Agent, or Firm*—Oliff & Berridge, PLC

[57] ABSTRACT

Hybrid drive system for a motor vehicle, including (a) an engine operated by combustion of a fuel, (b) a planetary gear mechanism having a sun gear and a carrier one of which is connected to the engine, and a ring gear connected to an output member, (c) a motor/generator connected to the output member, and (d) a differential gear device including output shafts and an input member rotated by a drive force received from the output member, and wherein the motor/generator, the planetary gear mechanism and the output member are arranged coaxially with each other along a first axis, and the output shafts of the differential gear device are disposed along a second axis parallel to the first axis. The planetary gear mechanism is disposed in a radially inner space provided radially inwardly of a stator coil of the motor/generator, and the input member includes a radially outer portion which overlaps a radially outer portion of the motor/generator in the radial direction of the motor/generator.

19 Claims, 18 Drawing Sheets

HYBRID DRIVE SYSTEM WHEREIN PLANETARY GEAR MECHANISM IS DISPOSED RADIALLY INWARDLY OF STATOR COIL OF MOTOR/GENERATOR

This application is based on Japanese Patent Applications No. 8-33578 filed Feb. 21, 1996 and No. 8-42842 filed Feb. 29, 1997, the contents of which are incorporated hereinto by reference.

CROSS REFERENCE TO RELATED APPLICATIONS

Not Applicable

BACKGROUND OF THE INVENTION

1. Field of the Invention

The present invention relates in general to a hybrid drive system for driving a motor vehicle, which is equipped with an engine and a motor/generator. More particularly, the present invention is concerned with such a hybrid vehicle drive system which is compact in construction.

2. Discussion of the Related Art

As a drive system for driving a motor vehicle, there is known a hybrid drive system including (a) an engine operated by combustion of a fuel, (b) a second motor/generator, (c) a planetary gear mechanism having a sun gear and a carrier which are connected to one and the other of the engine and the second motor/generator, and a ring gear connected to an output member, and (d) a first motor/generator connected to the output member of the planetary gear mechanism. An example of this type of hybrid vehicle drive system is disclosed in Publication No. 95208, Mar. 31, 1995, JIDOSHA GIJYUTSU JIREISYU, Intellectual Property Group, Japan Automobile Industry Association, and shown in FIG. 18. This hybrid drive system, which is indicated generally at 10 in FIG. 18, includes: an engine 12; a planetary gear mechanism 20 for mechanically distributing an output of the engine 12 received through a damper 14, to a second motor/generator 16 and an output member (in the form of a gear) 26; and a first motor/generator 22 whose torque is transmitted to the output member 26. The engine 12, damper 14, planetary gear mechanism 20 and second motor/generator 16 are disposed coaxially with each other so as to have a common axis of rotation and are arranged in an axially spaced relationship with each other. The first motor/generator 22 is disposed radially outwardly of and coaxially with the damper 14 and planetary gear mechanism 20.

The planetary gear mechanism 20 includes a sun gear connected to a motor shaft 24 of the second motor/generator 16, a carrier connected to the damper 14, and a ring gear connected to a rotor 22r of the first motor/generator 22. To the output member 26, there is connected the rotor 22r through a connecting member 18. The output member 26 meshes with a large gear 30 provided on an intermediate shaft 28, and a small gear 32 also provided on the intermediate shaft 28 meshes with an input member in the form of a ring gear 345 of a bevel gear type differential gear device 34, so that a drive force is transmitted from the output member 26 to right and left drive wheels (not shown) of the vehicle through the differential gear device 34. The second motor/generator 16 is used as an electric generator which is driven by the engine 12 to generate an electric energy for charging an electric energy storage device such as a battery. The first motor/generator 22 is used an an electric motor, which is operated alone or together with the engine as a drive power source for driving the vehicle. The first motor/generator 22 is required to provide a comparatively large torque, and has a larger size (diameter) than the second motor/generator 16.

In the known hybrid drive system constructed as described above, the planetary gear mechanism 20 is disposed radially inwardly of the rotor 22r of the first motor/generator 22. In this arrangement, the planetary gear mechanism 20 is likely to be adversely influenced by heat generated by the first motor/generator 22.

Also known is a hybrid vehicle drive system including (a) an engine operated by combustion of a fuel and disposed on a first axis, (b) a motor/generator disposed on the first axis, (c) an output member disposed on the first axis, and (d) a differential gear device including a pair of output shafts disposed on a second axis substantially parallel to the first axis, and an input member which is disposed rotatably about the second axis and which is rotated by a drive force received from the output member, so that the drive force is distributed through the pair of output shafts to right and left drive wheels of a motor vehicle. Such a hybrid drive system is disposed such that the first and second axes indicated above are substantially parallel to the transverse direction (width direction) of the motor vehicle, as in a front-engine front-drive vehicle. An example of this type of hybrid drive system is disclosed in JP-A-6-328951, wherein two motor/generators are disposed on the first axis for driving the vehicle and charging the electric energy storage device, respectively, and a gear type speed reducing mechanism is provided between the two motor/generators, so that a drive force is transmitted to the differential gear device through the speed reducing mechanism.

In the hybrid drive system as disclosed in JP-A-6-328951, the input member of the differential gear device is disposed so as to avoid an interference with the motor/generators, with a relatively large distance between the first and second axes. This arrangement suffers from a comparatively large size in the direction perpendicular to the first and second axes, and leads to reduced freedom in installing the hybrid drive system on the vehicle. This freedom is further reduced by the input member of the differential differential gear device, which generally has a relatively large diameter for withstanding a large torque.

SUMMARY OF THE INVENTION

It is therefore a principal object of the present invention to provide a hybrid drive system which is compact in construction.

It is a first optional object of this invention to provide such a compact hybrid drive system wherein the planetary gear mechanism is protected from heat generated by the first motor/generator.

It is a second optional object of this invention to provide such a compact hybrid drive system which has a reduced distance between the axis of the differential gear device and the axis of the first motor/generator.

The principal object and the first optional object may be achieved according to a first aspect of the present invention, which provides a hybrid drive system for a motor vehicle, comprising (a) an engine operated by combustion of a fuel, (b) a planetary gear mechanism having a sun gear and a carrier one of which is connected to the engine, a ring gear connected to an output member, and (c) a first motor/generator connected to the output member, and wherein the first motor/generator, the planetary gear mechanism and the output member are arranged coaxially with each other along a first axis, the hybrid drive system being characterized in that the first motor/generator has a stator coil which axially extends such that a radially inner space is provided radially inwardly of the stator coil, and in that the planetary gear mechanism is disposed in the radially inner space.

In the hybrid drive system according to the first aspect of this invention described above, the planetary gear mechanism is disposed in the radially inner space which is provided radially inwardly of the axially extending stator coil of the first motor/generator. This arrangement effectively utilizes the radial inner space provided radially inwardly of the stator coil, making it possible to reduce the axial dimension required for the planetary gear mechanism to be disposed adjacent to the first motor/generator, whereby the required overall axial dimension of the hybrid drive system can be reduced, or the diameter of the first motor/generator can be reduced by increasing its axial dimension. Further, the present arrangement is effective to protect the planetary gear mechanism from heat generated by the first motor/generator.

The first motor/generator is generally primarily used as an electric motor, that is, as a drive power source for driving the vehicle. The electric motor is used alone or together with the engine, as the drive power source. However, the first motor/generator may be used as an electric generator, which may be operated to apply a regenerative brake to the motor vehicle, as needed.

In a first preferred form of the invention, the output member is disposed on one side of the planetary gear mechanism which is remote from the first motor/generator. According to one advantageous arrangement of this first preferred form of the invention, the hybrid drive system further comprises a second motor/generator disposed on the first axis. In this case, the other of the sun gear and the carrier of the planetary gear mechanism which is not connected to the engine is connected to the second motor/generator.

In a second preferred form of the invention, the output member is disposed on one side of the first motor/generator which is remote from the planetary gear mechanism. According to one advantageous arrangement of this second preferred form of the invention, the hybrid drive system further comprises a second motor/generator indicated above. In this case, too, the other of the sun gear and the carrier of the planetary gear mechanism is connected to the second motor/generator.

The second motor/generator provided in addition to the first motor/generator is generally primarily used as an electric generator for generating an electric energy. In this case, the second motor/generator used as the electric generator is operated by the engine through the planetary gear mechanism, so that the generated electric energy is stored in a battery or other suitable electric energy storage device. However, the second motor/generator may be used as an electric motor for rotating the output member through the planetary gear mechanism for driving the motor vehicle, or for starting the engine.

In the above advantageous arrangements wherein the second motor/generator is provided, the sun gear and the ring gear of the planetary gear mechanism are connected to one and the other of the engine and the second motor/generator. However, it is preferable that the sun gear and the carrier be connected to the second motor/generator and the engine, respectively. Suitable clutches may be provided for selective connection or disconnection of the planetary gear mechanism to or from the engine and second motor/generator, or for selective connection or disconnection of two rotary elements selected from the sun gear, carrier and ring gear of the planetary gear mechanism. For absorbing speed and torque variations of the engine, a suitable damper may be provided between the engine and the planetary gear mechanism. The damper may be an elastic member such as a spring and a rubber member.

In the above-indicated advantageous arrangement of the first preferred form of the invention, the second motor/generator may be disposed on one side of the output member which is remote from the planetary gear mechanism. In this case, the engine is disposed on one side of the second motor/generator which is remote from the output member. Thus, the planetary gear mechanism and the output member are disposed between the first motor/generator and the second motor/generator, and the second motor/generator is disposed between the output member and the engine. In this arrangement, therefore, a damper connected to the output shaft of the engine may be disposed radially inwardly of the stator coil of the second motor/generator. This arrangement is effective to further reduce the required axial dimension of the hybrid drive system. Preferably, the second motor/generator is connected to the planetary gear mechanism, by a connecting shaft which extends through the output member, while the engine is connected to the planetary gear mechanism, by an input shaft which extends through the connecting shaft.

In the above-indicated advantageous arrangement of the first preferred form of the invention, the second motor/generator may be disposed on one side of the first motor/generator which is remote from the planetary gear mechanism. In this case, the engine is disposed on one side of the output member which is remote from the planetary gear mechanism. Alternatively, the second motor/generator may be disposed on one side of the first motor/generator which is remote from the planetary gear mechanism. In this case, the engine is disposed on one side of the second motor/generator which is remote from the first motor/generator. In these cases, the first motor/generator and the second motor/generator are disposed adjacent to each other, and may be isolated from each other by a partition wall which partially defines two spaces in which are accommodated the first motor/generator and the second motor/generator. This arrangement is effective to reduce the required axial dimension of the hybrid drive system.

In the case where the engine is disposed on one side of the output member which remote from the planetary gear mechanism, the second motor/generator is preferably connected to the planetary gear mechanism by a connecting shaft extending through the first motor/generator, while the engine is preferably connected to the planetary gear mechanism by an input shaft extending through the output member.

In the case where the engine is disposed on one side of the second motor/generator which is remote from the first motor generator, the second motor/generator is preferably connected to the planetary gear mechanism by a connecting shaft extending through the first motor/generator, while the engine is preferably connected to the planetary gear mechanism by an input shaft extending through the connecting shaft.

In the above preferred arrangement of the second preferred form of the invention, the second motor/generator may be disposed on one side of the output member which is remote from the first motor/generator. In this case, the engine is disposed is disposed on one side of the second motor/generator which is remote from the planetary gear mechanism. Since the second motor/generator, output member, first motor/generator and planetary gear mechanism are arranged along the first axis in the order of description, and since the engine is disposed on one side of the second motor/generator remote from the output member, a damper connected to the output shaft of the engine may be disposed radially inwardly of the stator coil of the second motor/generator, whereby the required axial dimension of the hybrid drive system can be further reduced. The second motor/generator is preferably connected to the planetary gear mechanism by a connecting shaft extending through the first motor/generator and the output member, while the engine is preferably connected to the planetary gear mechanism by an input shaft extending through the connecting shaft.

In the above advantageous arrangement of the second preferred form of the invention, the the second motor/generator may be disposed on one side of the planetary gear mechanism which is remote from the first motor/generator. In this case, the engine is disposed on one side of the second motor/generator which is remote from the planetary gear mechanism. Since the second motor/generator, planetary gear mechanism, first motor/generator and output shaft are arranged along the first axis in the order of description, and since the engine is disposed on one side of the second motor/generator remote from the planetary gear mechanism, the damper connected to the output shaft of the engine may be disposed radially inwardly of the stator coil of the second motor/generator, whereby the required axial dimension of the hybrid drive system can be further reduced. The engine is preferably connected to the planetary gear mechanism by an input shaft extending through the second motor/generator.

In a third preferred form of the invention, the hybrid drive system further comprises a second motor/generator which is disposed on one side of the output member on the first axis and which is connected to the other of the sun gear and the carrier of the planetary gear mechanism, and the engine has an output shaft, and a damper connected to the output shaft. In this form of the invention, the second motor/generator has a stator coil which axially extends toward the engine such that a radially inner space is provided radially inwardly of the stator coil of the second motor/generator, so that the damper is disposed in the radially inner space provided radially inwardly of the stator coil of the second motor/generator, and is isolated from the second motor/generator by a partition wall.

In the above third preferred form of the invention, the damper is disposed in the radially inner space located radially inwardly of the stator coil of the second motor/generator, and the damper and the second motor/generator are isolated from each other. This arrangement is effective to reduce the axial dimension required for the damper to be disposed adjacent to the second motor/generator, while at the same time preventing entry of dust or other foreign matters into a space in which the second motor/generator is accommodated. Thus, the present arrangement makes it possible to further reduce the required overall axial dimension of the hybrid drive system. Usually, the drive force is transferred from the output member to a speed reducing mechanism including an intermediate shaft, and a differential gear device. Since the second motor/generator which generally has a comparatively small diameter is disposed adjacent to the output member, the speed reducing mechanism and the differential gear device may be disposed in substantial alignment with the second motor/generator in the axial direction, so that the axes of the speed reducing mechanism and the differential gear device may be located comparatively close to the first axis, whereby the required radial or diametric dimension of the hybrid drive system can be reduced.

In a fourth preferred form of this invention, the output member consists of a sprocket which engages a chain for transmitting power therefrom. The use of the sprocket as the output member is advantageous in that substantially no thrust force acts on the sprocket, making it possible to simplify the bearing for the sprocket. Further, the use of the chain in combination with the sprocket permits the speed reducing mechanism indicated above to be spaced apart from the output member in the radial direction of the output member, by a distance sufficient to avoid an interference of the speed reducing mechanism with the output member and the other elements disposed on the first axis, even where the elements (including the engine) on the first axis are disposed relatively close to each other. In other words, the use of the sprocket and chain makes it possible to reduce the required overall axial dimension of the hybrid drive system. In this respect, it is noted that the known hybrid drive system 10 shown in FIG. 18 uses the output member in the form of a gear 26 which is subject to a considerably large thrust force and is therefore required to be supported by ball bearings. The gear 26 requires an intermediate shaft 28 to be located close to it. The use of the ball bearings and the comparatively small distance between the gear 26 and the intermediate shaft 28 result in an increased distance between the engine 12 and the first motor/generator 22, and a resulting increase in the overall axial dimension of the hybrid drive system 10.

In a fifth preferred form of this invention, the hybrid drive system further comprises a differential gear device which receives a drive force from the output member and distributes the received drive force to right and left drive wheels of the motor vehicle. The differential gear device includes a pair of output shafts disposed along a second axis substantially parallel to the first axis, and an input member which is substantially aligned with the output member in an axial direction of the output shafts. Generally, the output member has a relatively small diameter while the input member of the differential gear device has a relatively large diameter, in order to amplify the drive torque to be transmitted to the drive wheels through the differential gear device. Since these output and input members having the relatively small and large diameters are substantially aligned in the axial direction, the input and output members can be positioned relatively close to each other in the radial direction, whereby the required radial or diametric dimension of the hybrid drive system can be reduced.

The differential gear device is preferably a bevel gear type, but may be a planetary gear type. Where a sprocket is used as the output member as described above with respect to the fourth preferred form of the invention, the sprocket may be connected by a chain directly to the input member of the differential gear device. However, a speed reducing mechanism is preferably interposed between the sprocket and the differential gear device. In this case, the speed reducing mechanism includes a first intermediate shaft connected to the chain, and a second intermediate shaft connected to the input member of the differential gear device. The first and second intermediate shafts are disposed on respective third and fourth axes. Where the hybrid drive system is installed on the motor vehicle such that the first, second, third and fourth axes are parallel to the transverse direction of the vehicle, these four axes may be positioned relative to each other in a plane perpendicular to the axes and parallel to the longitudinal direction of the vehicle, such that the third axis of the first intermediate shaft is located above and rearwardly of the first axis, while the fourth axis of the second intermediate shaft is located below and rearwardly of the third axis, and such that the second axis of the differential gear device is located almost right below the fourth axis. In this positional arrangement, a space is provided above the primary or first axis. This space may be used to accommodate appropriate components such as motor/generator controller or controllers (inverters) and an electric energy storage device connected to the motor/generator. Since the speed reducing mechanism is located rearwardly of the first axis, there is a relatively ample space in front of the first axis. This front space may be effectively utilized to absorb shocks upon collision of the vehicle. The speed reducing mechanism may be replaced by a transmission equipped with two or more pairs of shift gears and clutches to provide two or more speed ratios, a belt-and-pulley type continuously variable transmission, or a mechanism having a forward-drive position and a rear-drive position.

The hybrid drive system according to the above fifth preferred form of the invention is usually installed on the motor vehicle such that the first axis is substantially parallel to the transverse or width direction of the motor vehicle. Preferably, this hybrid drive system is used on a front-engine front-drive (FF) vehicle. However, the hybrid drive system may be used on a front-engine rear-drive (FR) motor vehicle, in which the first axis is parallel to the longitudinal or running direction of the vehicle. The hybrid drive system may be used for driving machines or devices other than motor vehicles.

In a sixth preferred form of this invention, the hybrid drive system further comprises a second motor/generator which is disposed on the first axis and which is connected to the other of the sun gear and thus carrier of the planetary gear mechanism, and the first motor/generator and the second motor/generator are spaced apart from each other in the axial direction. This arrangement makes it possible to increase the diameter of the second motor/generator and accordingly reduce its required axial dimension, and reduce the required diameter of the first motor/generator. In this respect, it is noted that the first motor/generator 22 and the second motor/generator 16 in the known hybrid drive system 10 of FIG. 18 partially overlap each other in the axial direction. That is, a part of the second motor/generator 16 is located within the first motor/generator 22. This conventional arrangement requires-the first motor/generator 22 to have a comparatively large diameter, and requires the second motor/generator 16 to have a comparatively large axial dimension for assuring a required torque (for generating an electric energy by a kinetic energy of the vehicle). Thus, the known hybrid drive system 10 tends to be large-sized, and suffer from a relatively low degree of freedom in its installation on the motor vehicle.

In a seventh preferred form of this invention, the hybrid drive system further comprises a partition wall which isolates the first motor/generator and the planetary gear mechanism from each other. The partition wall is effective to prevent the first motor/generator from being exposed to a lubrication oil which is supplied to lubricate the mutually meshing components and bearing portions of the planetary, gear mechanism. Thus, the partition wall assures improved operating reliability of the first motor/generator. In the conventional hybrid drive system 10 of FIG. 18, a lubrication oil containing foreign matters may enter the space accommodating the stator coil of the first motor/generator 22. The conventional system 10 is not constructed to permit easy provision of a partition wall for protecting the first motor/generator 22 from the lubrication oil.

The principal object and the second optional object may be achieved according to a second aspect of this invention, which provides a hybrid drive system for a motor vehicle having right and left drive wheels, comprising (a) an engine operated by combustion of a fuel, (b) a first motor/generator, (c) an output member connected to the first motor/generator, and (d) a differential gear device which receives a drive force from the output member and distributes the receives drive force to the right and left drive wheels, and wherein the engine, the first motor/generator and the output member are arranged coaxially with each other along a first axis, and the differential gear device includes a pair of output shafts disposed along a second axis substantially parallel to the first axis, and an input member which is rotatable about the second axis by the drive force received from the output member, the hybrid drive system being characterized in that the input member having a radially outer portion which overlaps a radially outer portion of the first motor/generator.

In the hybrid drive system constructed according to the second aspect of the present invention, the radially outer portion of the input member of the differential gear device overlaps the radially outer portion of the first motor/generator, so that the required radial distance between the input member and the first motor/generator, namely, the distance between the first and second axes can be reduced, whereby the required overall radial or diametric dimension of the hybrid drive system can be accordingly reduced. The present hybrid drive system which is compact in, construction can be installed on motor vehicles with an increased degree of freedom.

In a first preferred form of the second aspect of this invention, the hybrid drive system further comprises a second motor/generator disposed on the first axis, and wherein the input member is interposed between the first motor/generator and the second motor/generator in an axial direction of the input member.

In a second preferred form of the second aspect of the invention, the second axis is located below the first axis.

In a third preferred form of the second aspect of the invention, the hybrid drive system further comprises an intermediate rotary member disposed rotatably about a third axis substantially parallel to the first axis. In this form of the invention, the input member receives the drive force from the output member through the intermediate rotary member, and the third axis is located above the second axis.

In a fourth preferred form of the second aspect of the invention, the input member is aligned with the output member in an axial direction of the intermediate rotary member. That is, the axial position of the input member of the differential gear device is substantially the same as that of the output member. Generally, the output member has a relatively small diameter while the input member of the differential gear device has a relatively large diameter, in order to amplify the drive torque to be transmitted to the drive wheels through the differential gear device. Since these output and input members having the relatively small and large diameters are disposed at substantially the same axial position, the input and output members can be positioned relatively close to each other in the radial direction, whereby the required radial or diametric dimension of the hybrid drive system can be reduced.

In a fifth preferred form of the second aspect of the invention, the output member consists of a sprocket which engages a chain for transmitting the drive force from the sprocket to the input member. The use of the sprocket as the output member is advantageous in that substantially no thrust force acts on the sprocket, making it possible to simplify the bearing for the sprocket. Further, the use of the chain in combination with the sprocket permits the intermediate rotary member (described above with respect to the third preferred form) to be spaced apart from the output member in the radial direction of the output member, by a distance sufficient to avoid an interference of the intermediate rotary member with the output member and the other elements disposed on the first axis, even where the elements (including the engine) on the first axis are disposed relatively close to each other in the axial direction. In other words, the use of the sprocket and chain makes it possible to reduce the required overall axial dimension of the hybrid drive system. In this respect, it is noted that the known hybrid drive system disclosed in JP-A-6-328951 discussed above as the prior art uses a helical gear as the output member which is subject to a considerably large thrust force and is therefore required to be supported by ball bearings. In addition, a speed reducing mechanism including the intermediate rotary member in the known hybrid drive system is required to be disposed close to the first axis. The use of the ball bearings and the close relationship of the speed reducing mechanism with respect to the first axis requires the first motor/generator and the second motor/generator to be spaced apart from each other by a considerably large distance, resulting in an increase in the required overall axial dimension of the hybrid drive system.

The first motor/generator and/or the second motor/generator is/are not necessarily required to function as both of an electric motor and an electric generator, but may be adapted to function as either an electric motor or an electric generator. Where the hybrid drive system has both the first motor/generator and the second motor/generator, the first or second motor/generator is primarily used as an electric motor, that is, operated alone or together with the engine as the drive power source for driving the motor vehicle, and is used as an electric generator as needed, for applying a regenerative brake to the vehicle, for example. The other motor/generator is primarily used as an electric generator, which is operated by the engine through the planetary gear mechanism, for generating an electric energy which is used to operate the electric motor as the drive power source, or charge an electric energy storage device such as a battery. However, the motor/generator primarily used as the electric generator may be used as the electric motor for rotating the output member or for starting the engine. Either the first motor/generator or the seconds motor/generator may be used as the electric motor or drive power source. In the case where only the first motor/generator is provided, this motor/generator may be selectively used as the electric motor or electric generator, depending upon the running condition of the motor vehicle.

In the above first preferred form of the second aspect of the invention wherein the first motor/generator and the second motor/generator are both provided, the hybrid drive system may preferably comprise (a) the above-indicated engine operated by combustion of a fuel, (b) a planetary gear mechanism having a sun gear and a carrier one of which is connected to the engine, a ring gear connected to the above-indicated output member, (c) the above-indicated first motor/generator connected to the output member, (d) a second motor/generator disposed on the first axis and connected to the other of the sun gear and carrier of the planetary gear mechanism. In this case, the first motor/generator is used primarily as the electric motor, while the second motor/generator is used primarily as the electric generator. While the sun gear and the carrier of the planetary gear mechanism are connected to one and the other of the engine and the second motor/generator, respectively, it is desirable that the sun gear be connected to the second motor/generator, with the carrier being connected to the engine, since this arrangement makes it possible to lower the engine speed and thereby reduce the energy loss of the engine. Suitable clutches may be provided for selective connection and disconnection of the planetary gear mechanism with respect to the engine and the second motor/generator,, or for selective connection and disconnection of two elements selected from the sun gear, carrier and ring gear of the planetary gear mechanism. These clutches may be suitably controlled to establish the neutral mode of the hybrid drive system or to increase the power transmission efficiency of the engine.

In the case where the hybrid drive system comprises the engine, a damper connected to the output shaft of the engine, second motor/generator, output member, planetary gear mechanism and first motor/generator, these elements may be arranged in the order of description along the first axis. However, the positional arrangement of these elements in the axial direction may be suitable selected. For instance, the output member may be disposed on one side of the first motor/generator which is remote from the planetary gear mechanism. The principle of this second aspect of the present invention is equally applicable to the hybrid drive system which is not equipped with a planetary gear mechanism as described above. The above-indicated damper is preferably provided between the engine and the planetary gear mechanism, to absorb speed and torque variations of the engine. The damper may include an elastic member such as a spring or a rubber member.

The differential gear device may be of a bevel gear type or a planetary gear type. Where the sprocket is used as the output member as described above with respect to the fifth preferred form of the second aspect of the invention, the sprocket may be connected by the chain directly to the input member of the differential gear device. However, it is preferred that a speed reducing mechanism be provided between the sprocket and the differential gear device, so that the rotating speed of the input member is reduced with respect to that of the output member. In this case, the speed reducing mechanism includes a first intermediate shaft connected to the chain, and a second intermediate shaft connected to the input member. The first intermediate shaft is rotatable about a third axis, which may be located above and rearwardly of the first axis, when viewed in a plane perpendicular to the first axis and parallel to the longitudinal direction of the motor vehicle. The second intermediate shaft is rotatable about a fourth axis, which may be located below and rearwardly of the third axis. The input member and the output shafts of the differential gear device are rotatable about the second axis, which may be located below the fourth axis. In this positional arrangement, a space is provided above the primary or first axis. This space may be used to accommodate appropriate components such as motor/generator controller or controllers (inverters) and an electric energy storage device connected to the motor/generator. Since the speed reducing mechanism is located rearwardly of the first axis, there is a relatively ample space in front of the first axis. This front space may be effectively utilized to absorb shocks upon collision of the vehicle. The speed reducing mechanism may be replaced by a transmission equipped with two or more pairs of shift gears and clutches to provide two or more speed ratios, or a mechanism having a forward-drive position and a rear-drive position.

BRIEF DESCRIPTION OF THE DRAWINGS

The above and optional objects, features, advantages and technical and industrial significance of this invention will be better understood by reading the following detailed description of presently preferred embodiments of the invention, when considered in connection with the accompanying drawings, in which.

DETAILED DESCRIPTION OF THE PREFERRED EMBODIMENTS

Figure 1:
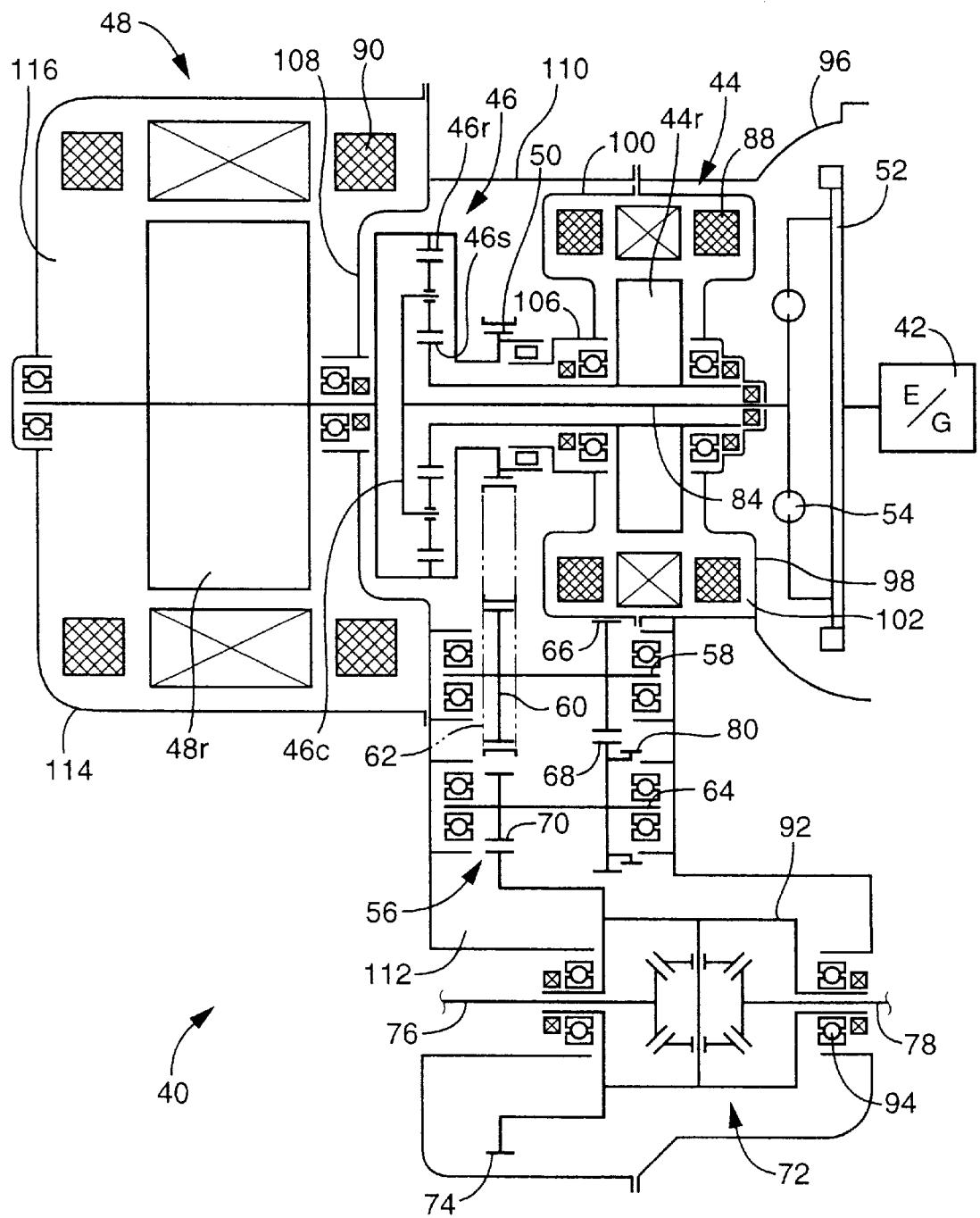
FIG. 1 is a schematic view showing a general arrangement of a hybrid drive system constructed according to a first embodiment of this invention.
Figure 2:
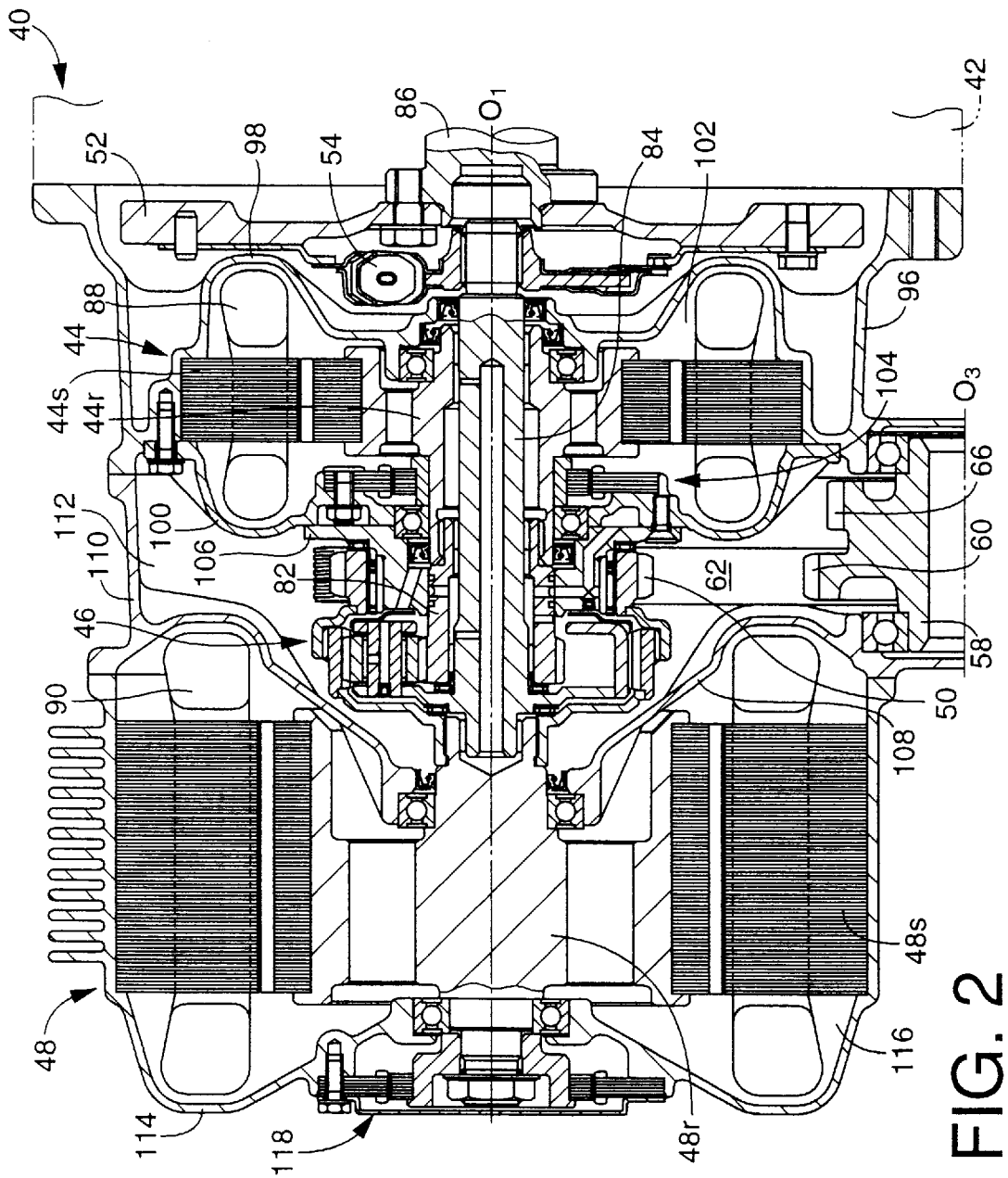
FIGS. 2 and 3 are developed cross sectional views showing in detail the construction of the hybrid drive system of FIG. 1.
Figure 3:
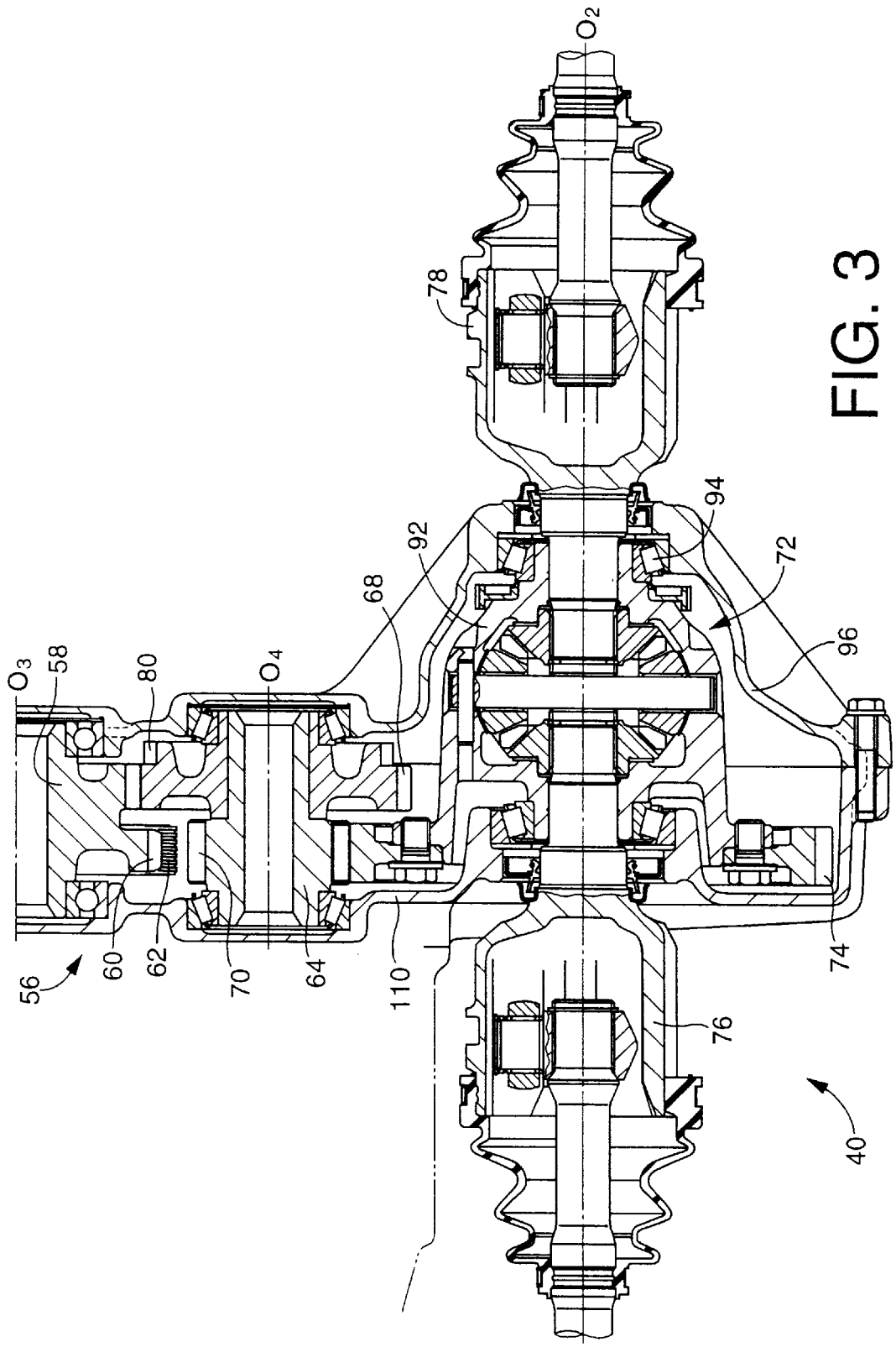
Figure 4:
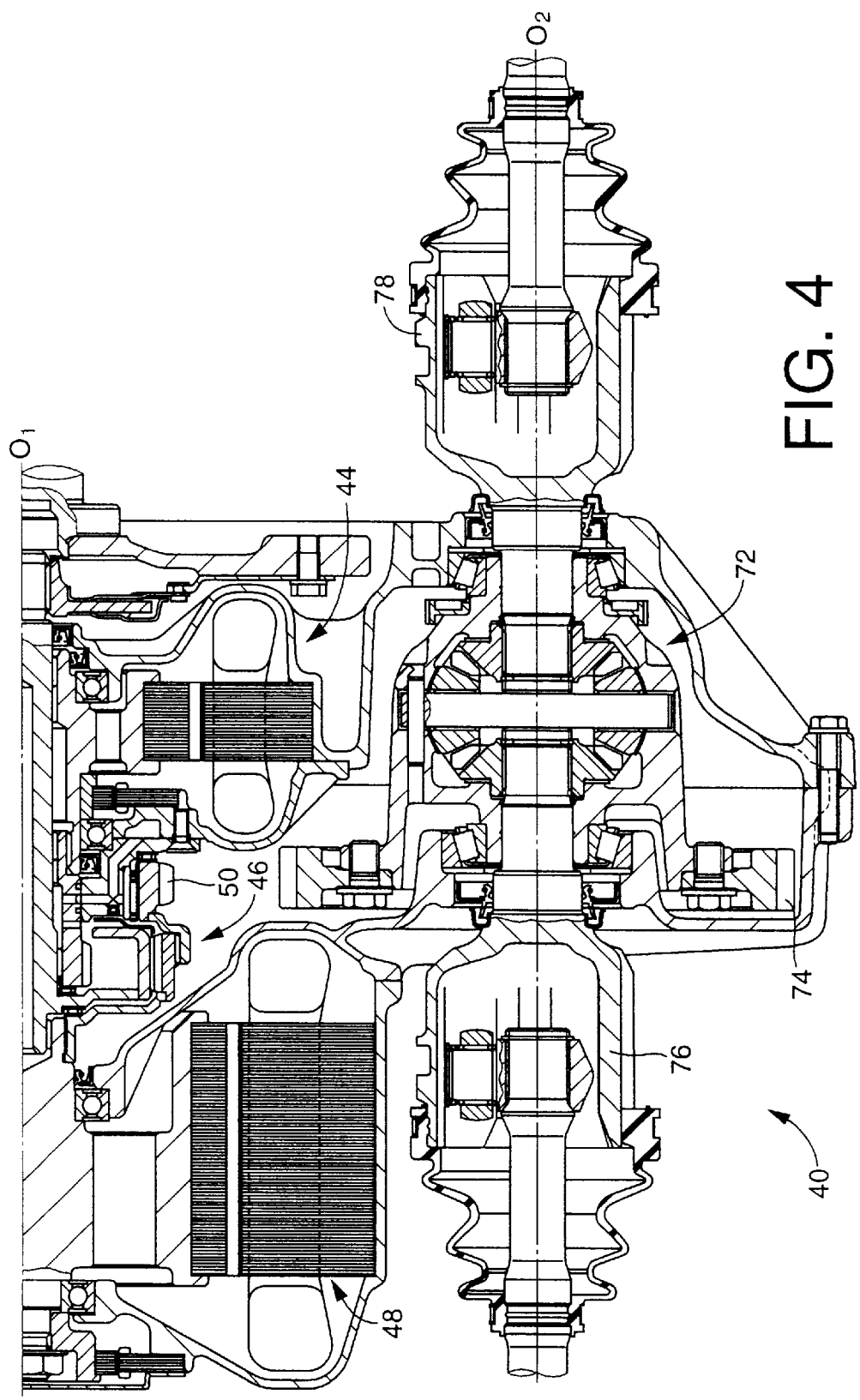
FIG. 4 is a developed cross sectional view taken along line 4—4 of FIG. 5, in a plane including a first axis O1 and a second axis O2 of the hybrid drive system of FIG. 1, which axes are indicated in FIGS. 2 and 3, respectively.

Referring to the schematic view of FIG. 1 and the developed cross sectional views of FIGS. 2–4, there is shown in detail the construction of a hybrid drive system 40 adapted for use on a front-engine front-drive motor vehicle (FF vehicle). The hybrid drive system 40 is disposed on the FF vehicle such that the axial direction of the hybrid drive system 40 is substantially parallel to the transverse direction (width direction) of the vehicle. The hybrid drive system 40 includes: an engine 42 such as an internal combustion engine, which is operated by combustion of a fuel; a second motor/generator 44; a planetary gear mechanism 46 of single pinion type; and a first motor/generator 48. The planetary gear mechanism 46 functions as a synthesizing/distributing mechanism for mechanically synthesizing and distributing a force.

The planetary gear mechanism 46 includes: a carrier 46c connected to the engine 42; a sun gear 46s connected to a rotor 44r of the second motor/generator 44; and a ring gear 46r which is connected to a rotor 48r of the first motor/generator 48 and to an output member in the form of a sprocket 50. The planetary gear mechanism 46 is arranged to primarily function to receive a rotary force from the engine 42 and distribute the received rotary force to the second motor/generator 44 and the sprocket 50. The second motor/generator 44 primarily functions as an electric generator, which is driven by the engine 42 through the planetary gear mechanism 46, to generate an electric energy which is supplied to the first motor/generator 48 or stored in an electric energy storage device 126 (FIG. 7) such as a battery. On the other hand, the first motor/generator 48 primarily functions as an electric motor, which is used alone or together with the engine 42, as a drive power source for driving the motor vehicle. The first motor/generator 48, which is required to provide a relatively large torque, is constructed to have a larger diameter than the second motor/generator 44 and to thereby reduce its overall axial length. An output of the engine 42 is transferred to the planetary gear mechanism 46 through a flywheel 52 and a damper 54. The flywheel 52 serves to reduce speed and torque variations of the engine 10. The damper 54 includes a suitable elastic member such as a spring or a rubber member.

The sprocket 50 serving as the output member is connected through a chain 62 to a driven sprocket 60 provided on a first intermediate shaft 58 of a speed reducing mechanism 56. The speed reducing mechanism 56 further includes a second intermediate shaft 64 parallel to the first intermediate shaft 58. The first and second intermediate shafts 58, 64 have respective speed reduction gears 66, 68 meshing with each other. The second intermediate shaft 64 further has an output gear 70. The rotating speed of the second intermediate shaft 64 is reduced relative to that of the first intermediate shaft 58, by a speed reducing action of the speed reducing gears 66, 68, and the rotary motion of the second intermediate shaft 64 is transferred through the output gear 70 to a differential gear device 72 of bevel gear type. The output gear 70 of the speed reducing mechanism 56 meshes with an input member of the differential gear device 72, which is a ring gear 74 having a relatively large diameter. The rotating speed of the ring gear 74 is reduced relative to that of the output gear 70. The differential gear device 72 has a pair of output shafts 76, 78 connected to front right and left drive wheels of the vehicle. The rotary drive force received by the ring gear 74 is distributed to the front right and left drive wheels through the respective output shafts 76, 78. The vehicle is equipped with a mechanical parking device including a parking gear formed integrally with the speed reducing gear 68 on the second intermediate shaft 64 of the speed reducing mechanism 56.

It will be understood that the first intermediate shaft 58 functions as an intermediate rotary member disposed between the output member 50 (sprocket) of the planetary gear mechanism 46 and the input member 74 (ring gear) of the differential gear device 72.

As is apparent from FIGS. 2–4, the engine 42, flywheel 52, damper 54, second motor/generator 44, sprocket 50, planetary gear mechanism 46 and first motor/generator 48 are arranged coaxially with each other on a substantially horizontally extending first axis O1, in the order of description in the axial direction such that those elements are disposed adjacent to each other. Described in detail, the sprocket 50 is disposed on one side of the planetary gear mechanism 46 remote from the first motor/generator 48, while the second motor/generator 44 is disposed on one side of the sprocket 50 remote from the planetary gear mechanism 46. The engine 42 is disposed one one side of the second motor/generator 44 remote from the sprocket 50, that is, such that the second motor/generator 44 is interposed between the engine 42 and the sprocket 50. A hollow shaft portion 82 is formed integrally with the sun gear 46s of the planetary gear mechanism 46. The shaft portion 82 extends through a radially inner portion of the sprocket 50 such that the shaft portion 82 is rotatable relative to the sprocket 50. The shaft portion 82 is splined to the rotor 44r of the second motor/generator 44, for rotation with the rotor 44r. An input shaft 84 extends through the center bores of the shaft portion 82 and the rotor 44r. The damper 54 has a radially inner member which is splined to one end portion of the input shaft 84 on the side of the second motor/generator 44, so that the input shaft 84 is rotated with the radially inner member of the damper 54. The carrier 46c of the planetary gear mechanism 46 is formed integrally with the other end portion of the input shaft 84. The carrier 46c rotatably supports a plurality of planetary gears which mesh with the sun gear 46s and the ring gear 46r.

It will be understood that the shaft portion 82 functions as a connecting shaft connecting the planetary gear mechanism 46 and the second motor/generator 44.

The radially outer member of the damper 54 is fixed to the flywheel 52 so that the radially outer member and the flywheel 52 are rotated as a unit. The flywheel 52 is fixed to a crankshaft 86 of the engine 42, for rotation with the crankshaft 86. The flywheel 52 is disposed adjacent to the second motor/generator 44. The second motor/generator 44 has a stator coil 88 which extends in the axial direction toward the flywheel 52, such that a radially inner space is provided radially inwardly of the stator coil 88. The damper 54 is disposed in this radially inner space. The first motor/generator 48 having the relatively large diameter has a stator coil 90 which extends in the axial direction toward the second motor/generator 44, such that a radially inner space is provided radially inwardly of the stator coil 90. The planetary gear mechanism 46 is disposed in this radially inner space located radially inwardly of the stator coil 90. The second motor/generator 44 and the first motor/generator 48 have only a small axial clearance therebetween, which is slightly larger than the width of the above-indicate chain 62. It will be understood that the crankshaft 86 functions as an output shaft of the engine 42.

The speed reducing mechanism 56 is disposed such that the first and second intermediate shafts 58, 64 have respective third and fourth axes O3 and O4 which are parallel to the first axis O1. The speed reducing mechanism 56 is axially positioned relative to the planetary gear mechanism 46 such that the driven sprocket 60 and the output gear 70 are substantially aligned with the sprocket 50, and is axially positioned relative to the second motor/generator 44 such that the speed reducing gears 66, 68 are substantially aligned with the first motor generator 44. The speed reducing gear 66 on the first intermediate shaft 58 is disposed radially outwardly of the second motor/generator 44 which has the relatively small diameter.

The differential gear device 72 is disposed such that the pair of output shafts 76, 78 have a second axis O2 parallel to the first axis O1. The differential gear device 72 is axially positioned relative to the planetary gear mechanism 46 such that the large ring gear 74 is substantially aligned with the sprocket 50. The differential gear device 72 has a differential casing 92 in which a differential mechanism is accommodated. The differential casing 92 is rotatably supported by bearings which includes a bearing 94 having a relatively small diameter. The differential gear device 72 is axially positioned relative to the second motor/generator 44 such that the differential casing 92 is substantially aligned with the second motor/generator 44, while the bearing 94 having the relatively small diameter is substantially aligned with the flywheel 52 having a relatively large diameter.

The ring gear 74 of the differential gear device 72 is positioned such that its radially outer portion is disposed between the axial clearance between the second motor/generator 44 and the first motor/generator 48, and so as to avoid an interference with the chain 62. Described in detail, the radially outer portion of the ring gear 74 overlaps the radially outer portions of the second motor/generator 44 and the first motor/generator 48 in the radial direction of first motor/generator 48 and the ring gear 74, as is apparent from the side elevational view of FIG. 5 and the cross sectional view of FIG. 4 taken along line 4—4 of FIG. 5 in a plane including the first and second axes O1, O2. The radially outer portion of the driven sprocket 60 on the first intermediate shaft 58 of the speed reducing device 56 is also disposed between the axial clearance between the first motor/generator 48 and the second motor/generator 44.

Figure 5:
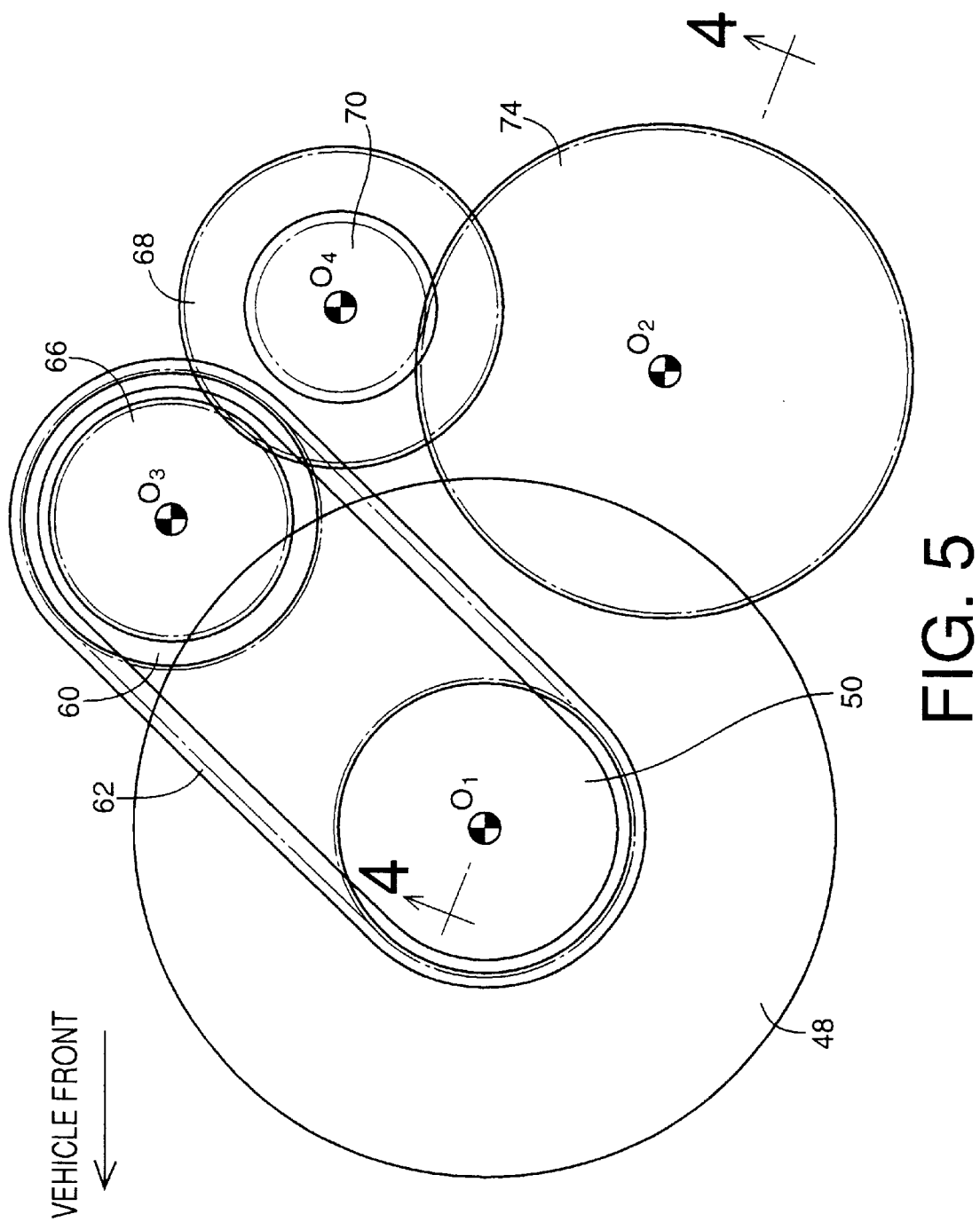
FIG. 5 is a schematic side elevational view of the hybrid drive system of FIG. 1, showing a positional relationship of four axes O1–O4 of the hybrid drive system, which include the first and second axes O1 and O2.
Figure 6:
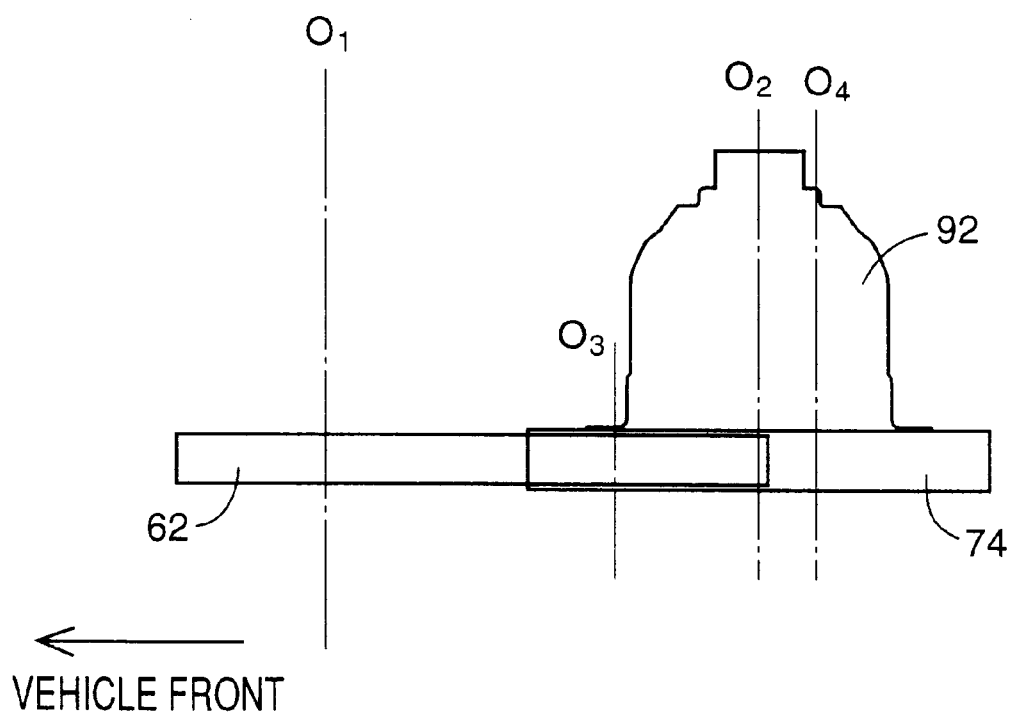
FIG. 6 is a schematic plan view of the hybrid drive system of FIG. 1, showing a positional relationship of the axes O1–O4.

Referring to the side elevational view of FIG. 5 and the plan view of FIG. 6, there is indicated the positional relationship of the first, second, third and fourth axes O1–O4. In FIGS. 5 and 6, the left side of the views corresponds to the front side of the motor vehicle. As is apparent from these views, the third axis O3 which is the axis of the first intermediate shaft 58 of the speed reducing mechanism 56 is located above and rearwardly of the first axis, while the fourth axis O4 which is the axis of the second intermediate shaft 64 is located below and rearwardly of the third axis O3. Further, the second axis O2 which is the axis of the output shafts 76, 78 of the differential gear device 72 is located below the fourth axis O4. The second axis O2 is the lowest axis of the four axes O1–O4.

Between the damper 54 and the second motor/generator 44, there is disposed a first partition wall 98 formed integrally with a first casing member 96 fixed to the engine 42. A second partition wall 100 (which functions to partially cover the second motor/generator 44) is also formed integrally with the first casing member 96. These first and second partition walls 98, 100 cooperate to define a first space 102 serving as a first motor space in which are accommodated the rotor 44r and stator 44s of the second motor/generator 44. In a radially inner portion of the first space 102 which is adjacent to the inner surface of the second partition wall 100 and is radially inwardly of the stator coil 88, there is disposed a rotary position detecting means in the form of a resolver 104. To a radially inner portion of the outer surface of the second partition wall 100 which corresponds to the resolver 104, there is integrally fixed a support member 106 which supports the sprocket 50 via a needle bearing such that the sprocket 50 is freely rotatable about its axis. The sprocket 50 is splined to the ring gear 46r of the planetary gear device 46, for rotation with the ring gear 46r. This arrangement permits easy assembling of the sprocket 50 with respect to the planetary gear device 46.

The support member 106 is fitted on the shaft portion 82 of the sun gear 46s, such that the shaft portion 82 is rotatable relative to the support member 106. The support member 106 has oil passages for lubrication of the planetary gear device 46 and the other devices. The stator 44s of the second motor/generator 44 is fixed to the first casing member 96, while the rotor 44r is rotatably supported by the first and second partition walls 98, 100 via a pair of ball bearings. This arrangement facilitates inspection of the second motor/generator 44 for its performance (the function as the electric generator as well as the function as the electric motor). An oil seal is provided for fluid tightness between the first partition wall 98 and the rotor 44r, and between the support member 106 integrally fixed to the second partition and the rotor 44r, so that the lubrication oil is prevented from entering the first space 102 (first motor space). An oil seal is also provided for fluid tightness between the first partition wall 98 and the input shaft 84, to prevent leakage of the lubrication oil supplied between the input shaft 84 and the rotor 44r and shaft portion 82.

A second casing member 110 is integrally fixed to the first casing member 96. The second casing member 110 has an integrally formed third partition wall 108. The second casing member 110 cooperates with the first casing member 96 and the second partition wall 100 to define a second space 112 in which there are accommodated the planetary gear mechanism 46, sprocket 50, speed reducing mechanism 56 and differential gear device 72. This second space 112 contains a suitable amount of oil for oil bath lubrication of the meshing gears and the bearings. Oil seals are provided for fluid tightness between the pair of output shafts 76, 78 and the first and second casing members 96, 110, to prevent leakage of the lubrication oil from the second space 112.

The third partition wall 108 is interposed between the planetary gear mechanism 46 and the first motor/generator 48. A third casing member 114 is formed integrally with the second casing member 110. The third partition wall 108 cooperates with the third casing member 114 to define a third space 116 serving as a second motor space in which there are accommodated the rotor 48r and stator 48s of the first motor/generator 48. A rotary position detecting means in the form of a resolver 118 is attached to the radially inner portion of the outer surface of the third casing member 114, which portion is located radially inwardly of the stator coil 90. The stator 48s of the first motor/generator 48 is fixed to the third casing member 114, while the rotor 48r is supported by the third partition wall 108 and the third casing member 114 via a pair of ball bearings such that the rotor 48r is freely rotatable about its axis. This arrangement facilitates inspection of the first motor/generator 48 for its performance (the function as the electric generator as well as the function as the electric motor). An oil seal is provided for fluid tightness between the rotor 48r and the third partition wall 108, so that the lubrication oil in the second space 112 is prevented from entering the third space 116 (second motor space). The ring gear 46r of the planetary gear mechanism 46 is splined to the end portion of the rotor 48r which extends through the third partition wall 108, so that the ring gear 46r is rotated with the rotor 48r. The input shaft 84 indicated above is supported by the rotor 44r of the second motor/generator 44 and the rotor 48r of the first motor/generator 48 such that the input shaft 84 is rotatable about its axis (first axis O1) relative to the rotors 44r, 48r. The input shaft 84 has oil passages formed therethrough in the axial and radial directions, for lubricating the support portions at which the input shaft 84 is supported.

Figure 7:
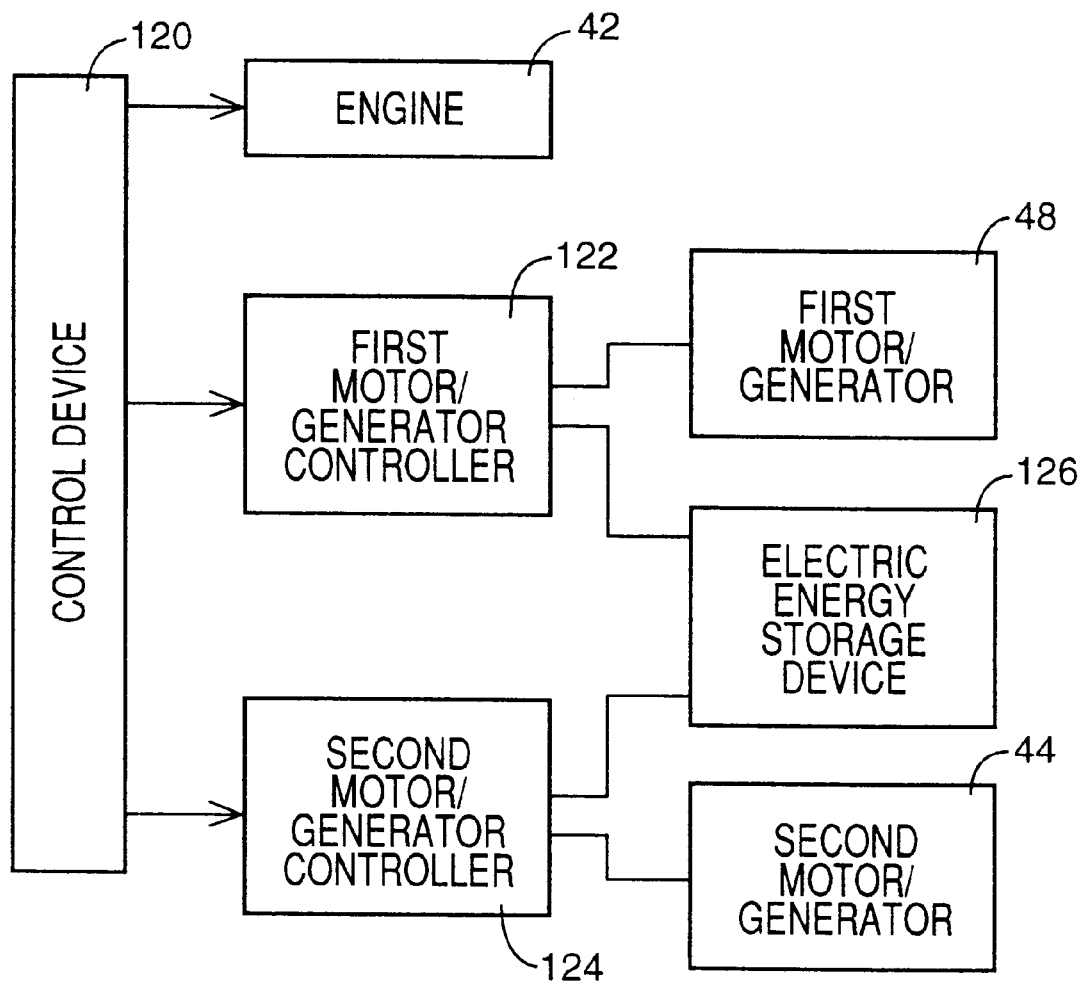
FIG. 7 is a block diagram illustrating a control system of the hybrid drive system of FIG. 1.

The hybrid drive system 40 is provided with a control system as shown in FIG. 7, which includes a control device 120. The engine 42 is controlled by the control device 120. Described in detail, the control device 120 controls the opening angle of a throttle valve, the amount of fuel injection, and the ignition timing and other operating conditions of the engine 42. The first motor/generator 48 and the second motor/generator 44 are connected to the electric energy storage device 126 (e.g., battery) through respective first and second motor/generator controllers 122, 124. The control device 120 controls the second motor/generator 44 and the first motor/generator 48 so as to selectively place each motor/generator in one of a DRIVE state, a CHARGING state and a NON-LOAD or FREE state. In the DRIVE state, the motor/generator 44, 48 is operated as an electric motor to provide a predetermined torque, with an electric energy stored in the storage device 126 or generated by and supplied from the other motor/generator. In the CHARGING state, the motor/generator 44, 48 is operated as an electric generator or dynamo, by regenerative braking (i.e., electrical braking torque of the motor/generator per se), so as to charge the electric energy storage device 126. In the NON-LOAD state or FREE state, the motor/generator 44, 48 is placed in a non-load condition permitting free rotation of the rotor 44r, 48r.

The control device 120 includes a microcomputer incorporating a central processing unit (CPU), a random-access memory (RAM) and a read-only memory (ROM), and is adapted to control the hybrid drive system 40 according to predetermined control programs so that the hybrid drive system 40 is operated in a selected one of different operation modes including a MOTOR DRIVE mode, an ENGINE DRIVE AND CHARGING mode, an ENGINE-MOTOR DRIVE mode, a REGENERATIVE BRAKING mode, and a CHARGING mode. In the MOTOR DRIVE mode, the second motor/generator 44 is placed in the NON-LOAD state while the first motor/generator 48 is operated as an electric motor serving as the drive power source for driving the motor vehicle. In the ENGINE DRIVE AND CHARGING mode, the second motor/generator 44 is operated as an electric generator and so as to function as a reaction member, while the first motor/generator 48 is placed in the NON-LOAD state, and the engine 42 is operated as the drive power source for driving the motor vehicle, while the electric energy storage device 126 is charged by the second motor/generator 44. In the ENGINE-MOTOR DRIVE mode, the second motor/generator 44 is operated as an electric generator, while the engine 42 and the first motor/generator 48 are both operated as the drive power source for driving the motor vehicle. In this ENGINE-MOTOR DRIVE mode, the first motor/generator 48 is operated by the electric energy generated by the second motor/generator 44 or stored in the storage device 126. The REGENERATIVE BRAKING mode is established while the motor vehicle is braked during running. In the REGENERATIVE BRAKING mode, the first motor/generator 48 is operated as an electric generator by the kinetic energy of the motor vehicle, so as to charge the storage device 126 while applying a regenerative brake to the vehicle. The CHARGING mode is established while the vehicle is stopped. In this CHARGING mode, the second motor/generator 44 is operated as an electric generator while the engine 42 is operated to drive the second motor/generator 44 as the electric generator for charging the storage device 126.

The control device 120 receives various signals from various detectors or sensors, which represent information necessary to select the appropriate one of the operation modes. The signals received by the control device 120 include: a signal indicative of the operating amount of an accelerator pedal provided on the vehicle; a signal indicative of the running speed of the vehicle; a signal indicative of the amount of electric energy stored in the storage device 126; a signal indicative of an operation of a brake operating member (e.g., brake pedal); and a signal indicative of the currently selected position of a shift lever.

Figure 18:
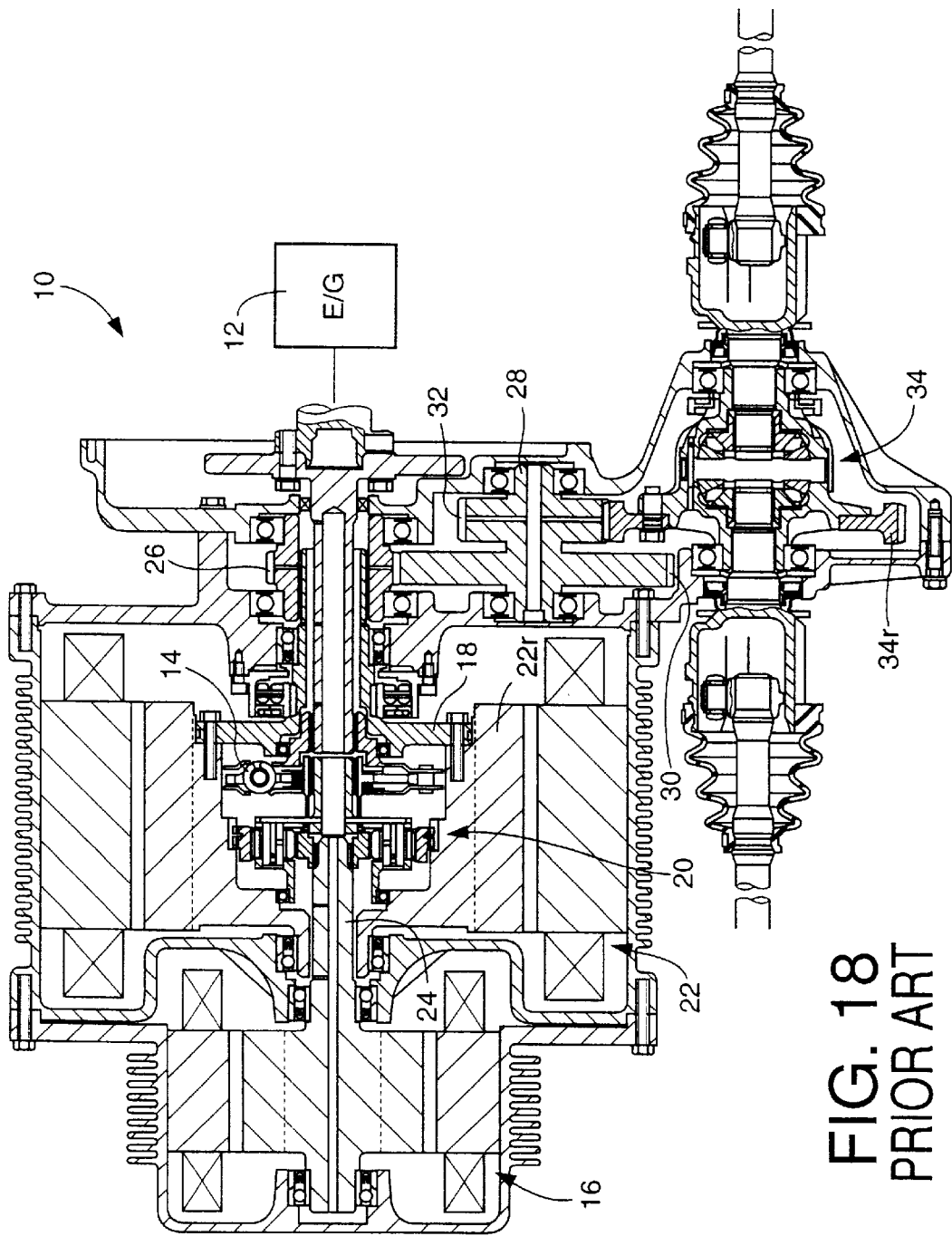
FIG. 18 is a cross sectional view showing one example of a known hybrid drive system.

In the hybrid drive system 40 of the present embodiment of the invention, the first motor/generator 48 and the second motor/generator 44 are axially spaced apart from each other. The second motor/generator 44 has a larger diameter and a smaller axial dimension than the second motor/generator 16 of the known hybrid drive system of FIG. 18, and the first motor/generator 48 has a small diameter than the first motor/generator 22 of the known hybrid drive system of FIG. 18.

Further, the planetary gear mechanism 46 is disposed in the radially inner space provided radially inwardly of the stator coil 90 which extends axially of the first motor/generator 48 toward the second motor/generator 44. In addition, the planetary gear mechanism 46 is isolated from the first motor/generator 48 by the third partition wall 108 interposed therebetween. This arrangement makes it possible to reduce the axial dimension required for the planetary gear mechanism 46 to be disposed adjacent to the first motor/generator 48, whereby the required overall axial dimension of the hybrid drive system 40 can be reduced, or the diameter of the first motor/generator 48 can be reduced by increasing its axial dimension. Further, the present arrangement is effective to prevent entry of the lubrication oil into the second motor space 116 and adverse thermal influence of the first motor/generator 48 on the planetary gear mechanism 46, to thereby assure improved operating reliability of the planetary gear mechanism 46 and the first motor/generator 48. The damper 54 is disposed in a space provided radially inwardly of the stator coil 88 which extends axially of the second motor/generator 44 toward the flywheel 52. This arrangement makes it possible to reduce the axial dimension of the damper 54. Further, the damper 54 is isolated from the second motor/generator 44 by the first partition wall 98, whereby the first motor space 102 is protected against entry of the lubrication oil and dust or other foreign matters.

The sprocket 50 serves as the output member of the planetary gear mechanism 46 which functions as the synthesizing/distributing mechanism 46. This sprocket 50 is connected to the driven sprocket 60 through the chain 62. In this arrangement, a thrust load is less likely to act on the sprocket 60, making is possible to use a needle bearing for supporting the sprocket 60. The use of the needle bearing for supporting the sprocket 50 permits the present hybrid drive system 40 to have a smaller axial dimension than the known hybrid drive system wherein the sprocket is supported by ball bearings. In addition, the use of the chain 62 for connecting the sprocket 50 and the first intermediate shaft 58 of the speed reducing mechanism 56 provides an increased degree of freedom in positioning the first intermediate shaft 58. Namely, the first intermediate shaft 58 can be positioned radially outwardly of the second motor/generator 44 having the relatively small diameter, with a sufficient radial distance from the sprocket 50. This arrangement permits the second motor/generator 44 to be axially positioned close to the sprocket 50, resulting in further reduction of the axial dimension of the hybrid drive system 40. Since the speed reducing mechanism 56 is disposed radially outwardly of the second motor/generator 44 having the relatively small diameter, the radial dimension of the hybrid drive system 40 (in the direction perpendicular to the first axis O1) can be reduced.

Generally, the sprocket 50 has a relatively small diameter while the ring gear 74 of the differential gear device 72 has a relatively large diameter, for the purpose of amplifying the torque. These sprocket 50 and ring gear 74 are substantially aligned with each other in the axial direction. Further, the differential casing 92 having a medium diameter and the second motor/generator 44 are substantially aligned with each other in the axial direction, while the flywheel 52 having a relatively large diameter and the bearing 94 having a relatively small diameter are substantially aligned with each other in the axial direction. These arrangements make it possible to reduce the radial distance between the first axis O1 (which is the axis of the flywheel 52, first motor/generator 48 and second motor/generator 44) and the fourth axis O4 (which is the axis of the differential gear device 72), and also the axial dimension of the hybrid drive system 40.

The present embodiment is further advantageous in that the radially outer portion of the ring gear 74 of the differential gear device 72 overlaps the radially outer portions of the first motor/generator 48 and the second motor/generator 44. That is, the distance between the first and second axes O1 and O2 is reduced by the overlapping radial distance, thereby reducing the radial dimension of the hybrid drive system 40 (in the direction perpendicular to the first axis O1).

Thus, the present hybrid drive system 40 has a significantly reduced overall size, owing to the reduction of the axial and radial dimensions as described above, whereby the hybrid drive system 40 is made compact and has an increased degree of freedom in its installation on a motor vehicle.

It is also significant to note that the first motor/generator 48 and the second motor/generator 44 are isolated from each other by the partition walls 98, 100, 108 and the third casing member 114, while the first and second motor spaces 102, 116 are fluid-tightly sealed by suitable oil seals, to prevent entry of the lubrication oil which may contain iron particles and other foreign matters, which would cause some malfunctioning of the motor/generator 44, 48. Thus, the present hybrid drive system 40 assures improved operating reliability, with the motor/generator 44, 48 maintaining the intended functions as the electric motor and the electric generator.

The use of the chain 62 in place of mutually meshing gears having large diameters disposed on the respective first and second axes O1, O2 permits a reduced amount of energy loss due to the agitation of the lubrication oil by those gears.

The third axis O3 which is the axis of the first intermediate shaft 58 of the speed reducing mechanism 56 is located above and rearwardly of the first axis O1, while the fourth axis O4 which is the axis of the second intermediate shaft 64 is located below and rearwardly of the third axis O3. Further, the second axis O2 which is the axis of the differential gear device 72 is located below the fourth axis O4. In this arrangement, a space is provided above the first axis O1, namely, above the engine 42, first motor/generator 48 and second motor/generator 44, so that this space may be used to accommodate appropriate components such as the motor/generator controllers 122, 124 and the electric energy storage device 126 which have been described above by reference to FIG. 7. Since the speed reducing mechanism 56 is located rearwardly of the first axis O1, there is provided a relatively ample space in front of the engine 42, first motor/generator 48 and second motor/generator 44, so that this space may be used to effectively absorb shocks in the event of a collision of the vehicle.

Figure 8:
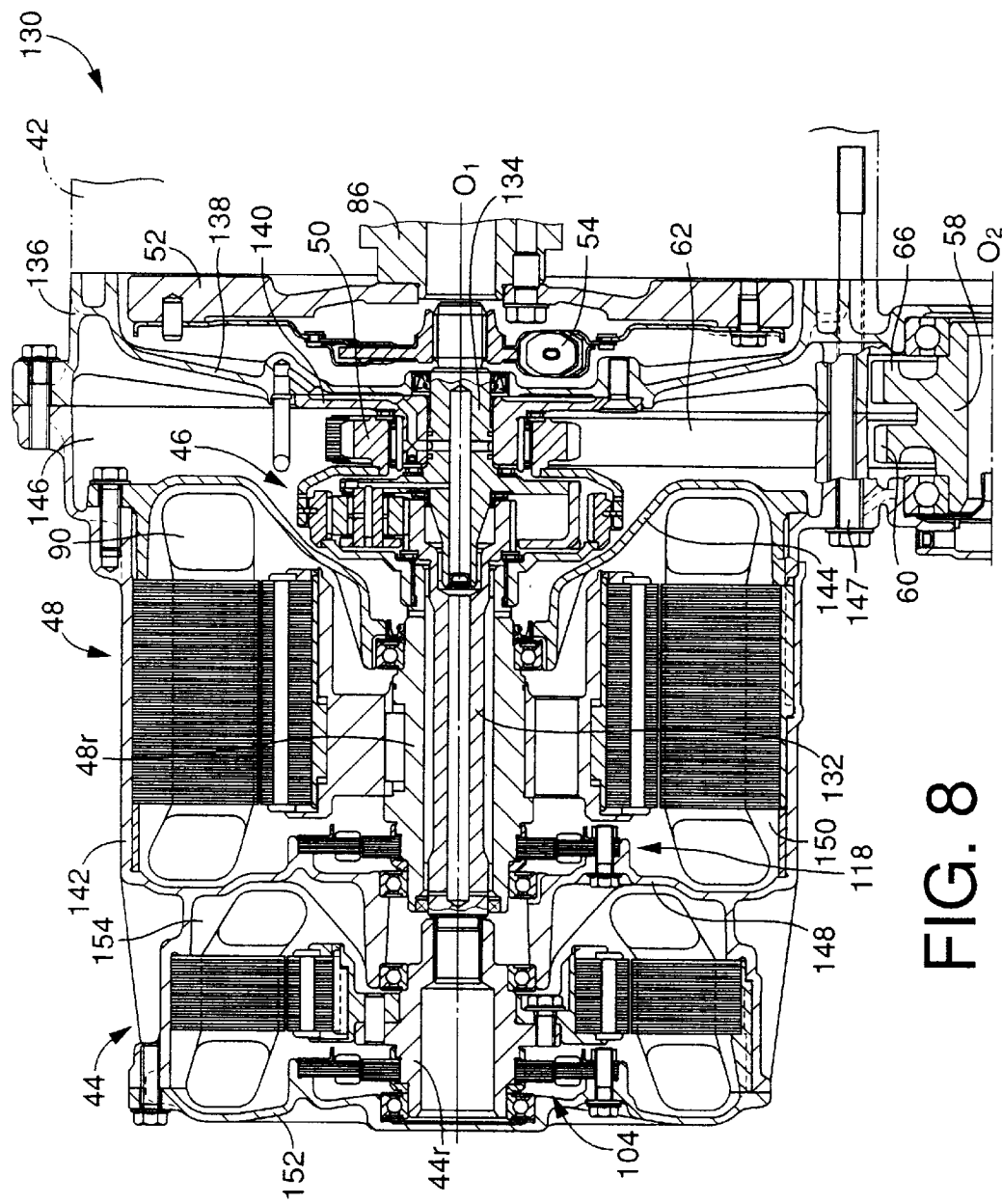
FIGS. 8 and 9 are developed cross sectional views showing in detail the construction of a hybrid drive system according to a second embodiment of this invention.
Figure 9:
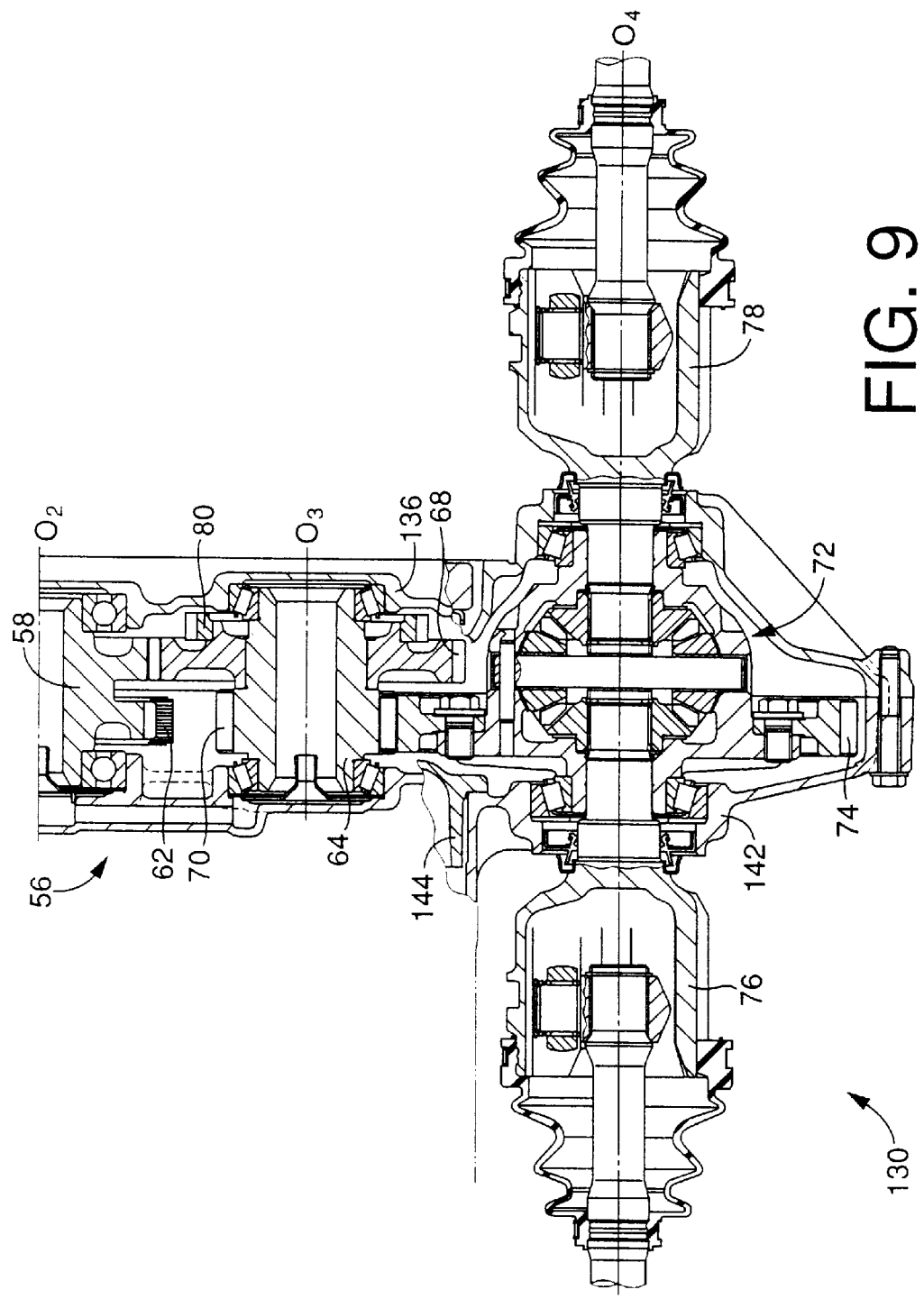
Figure 10:
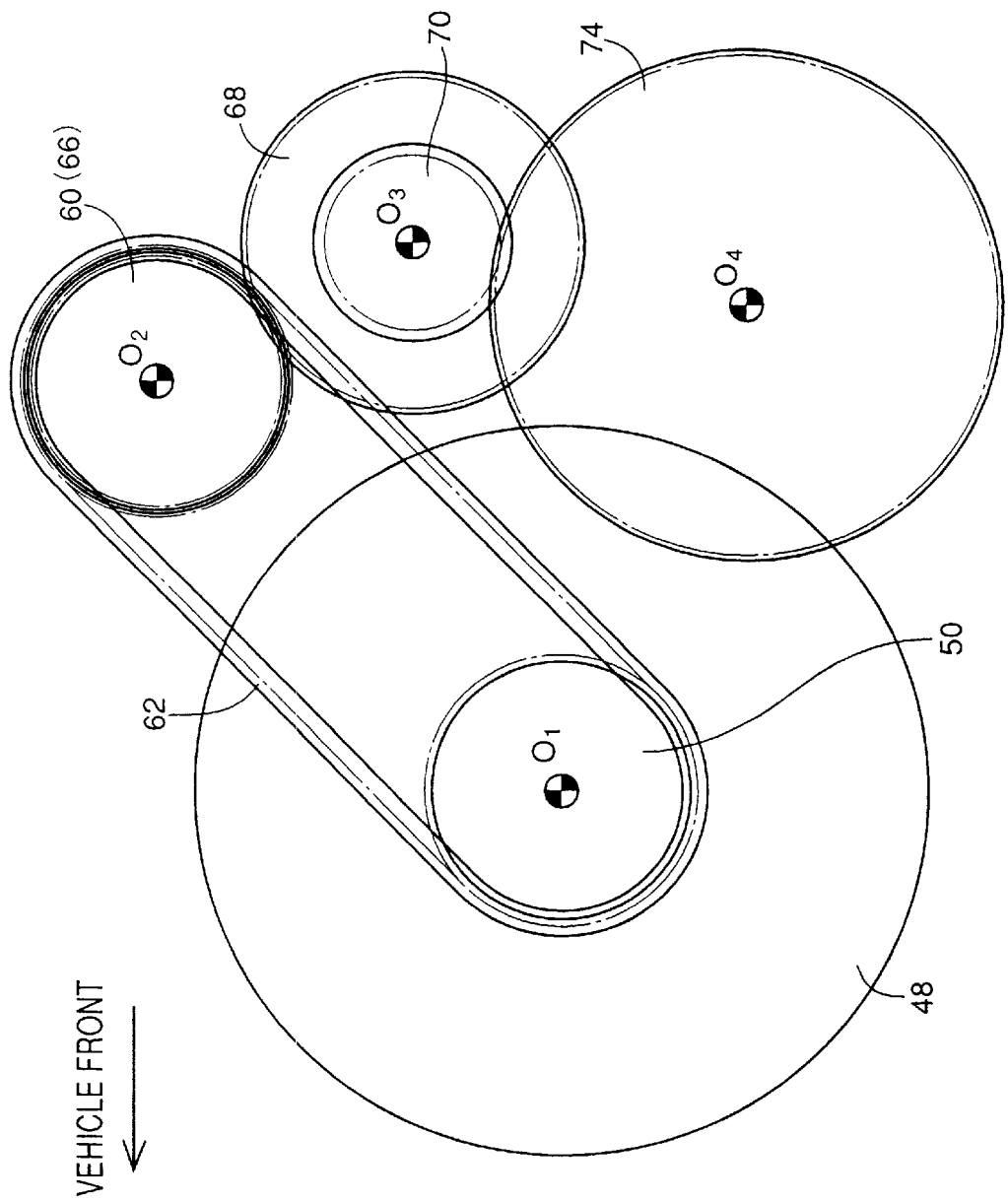
FIG. 10 is a schematic side elevational view of the hybrid drive system of FIGS. 8 and 9, showing a positional relationship of four axes O1–O4 of the system.

Referring next to FIGS. 8–10, there is shown a hybrid drive system 130 constructed according to a second embodiment of this invention. The developed cross sectional views of FIGS. 8 and 9 correspond to those of FIGS. 2 and 3, while the side elevational view of FIG. 10 corresponds to that of FIG. 5. Like the hybrid drive system 40, the hybrid drive system 130 includes the engine 42, flywheel 52, damper 54, sprocket 50, planetary gear mechanism 46, second motor/generator 44, first motor/generator 48, speed reducing mechanism 56 and differential gear device 72, which are connected to each other as described above with respect to the first embodiment. However, the positional relationship of these elements (except the device 72) along the first axis O1 in this second embodiment is different from that in the first embodiment.

As in the hybrid drive system 40 of the first embodiment, the planetary gear mechanism 46 is disposed in a radially inner space located radially inwardly of the stator coil 90 which extends axially of the first motor/generator 48, and the sprocket 50 is disposed on one side of the planetary gear mechanism 46 remote from the first motor/generator 48. However, the second motor/generator 44 is disposed on one side of the first motor/generator 48 which is remote from the planetary gear mechanism 46, while the sprocket 50 is disposed between the planetary gear mechanism 46 and the engine 42, more precisely, between the planetary gear 46 and the flywheel 52 (damper 54). That is, the engine 42, flywheel 52, damper 54, sprocket 50, planetary gear mechanism 46, first motor/generator 48 and second motor/generator 44 are axially arranged in the order of description along the first axis O1, such that these elements are disposed adjacent to each other. It is noted that the first motor/generator 48 and the second motor/generator 44 are axially spaced apart from each other.

The rotor 44r of the second motor/generator 44 is splined to one end portion of a connecting shaft 132, so that the rotor 44r and the connecting shaft 132 are rotated together. The connecting shaft 132 extends through the bore of the rotor 48r of the first motor/generator 48, such that the connecting shaft 132 is rotatable relative to the rotor 48r. The sun gear 46s of the planetary gear mechanism 46 is formed integrally with the other end portion of the connecting shaft 132. An input shaft 134 extends through the radially inner portion of the sprocket 50, such that the input shaft 134 is rotatable relative to the sprocket 50. The radially inner member of the damper 54 is splined to one end portion of the input shaft 134 so that the damper 54 and the input shaft 134 are rotated together. The carrier 46c of the planetary gear mechanism 46 is formed integrally with the other end portion of the input shaft 134.

Between the damper 54 and the sprocket 50, there is disposed a first partition wall 138 formed integrally with a first casing member 136 which is fixed to the engine 42. To the first partition wall 138, there is fixed a support member 140 which freely rotatably supports the sprocket 50 via a needle bearing. The input shaft 134 indicated above extends through bores in the first partition wall 138 and the support member 140, such that the input shaft 134 is rotatable relative to the partition wall 138 and support member 140. An oil seal is provided for fluid tightness between the input shaft 134 and the first partition wall 138, to prevent leakage of the lubrication oil toward the engine 42. The first partition wall 138, support member 140 and input shaft 134 have oil passages for lubrication of the planetary gear mechanism 46 and the other devices.

A second casing member 142 is integrally fixed to the first casing member 136, and a second partition wall 144 is integrally fixed to the second casing member 142. The second partition wall 144 is interposed between the first motor/generator 48 and the planetary gear mechanism 46. The first casing member 136, second casing member 142 and second partition wall 144 cooperate to define a first space 146 in which there are accommodated the planetary gear mechanism 46, sprocket 50, speed reducing mechanism 56 and differential gear device 72. A suitable amount of lubrication oil is contained in the first space 146, for oil bath lubrication of the mutually meshing gears and the bearing portions. Oil seals are provided for fluid tightness between the pair of output shafts 76, 78 of the differential gear device 72 and the first and second casing members 136, 142. The casing members 136, 142 are secured to the engine 42 by bolts 147 which are located within the loop of the chain 62. A separate parking gear 80 is fixed to the speed reduction gear 68 of the speed reducing mechanism 56.

The second casing member 142 has an integrally formed third partition wall 148 which is interposed between the second motor/generator 44 and the first motor/generator 48. The third partition wall 148 cooperates with the second partition wall 144 to define a second space 150 (first motor space) in which are accommodated the rotor 48r and stator of the first motor/generator 48. The stator of the first motor/generator 48 is secured to the second casing member 142, while the rotor 48r is supported by the partition walls 144, 148 through a pair of ball bearings, such that the rotor 48r is freely rotatable about its axis. This arrangement facilitates inspection of the first motor/generator 48 for its performance (the function as the electric motor as well as the function as the electric generator). An oil seal is provided for fluid tightness between the rotor 48r and the second partition wall 144, to prevent entry of the lubrication oil from the first space 146 into the 'second space 150. The connecting shaft 132 extending through the rotor 48r is supported by the rotor 48r such that the connecting shaft 132 and the rotor 48r are rotatable relative to each other. The axial end portion of the rotor 48r which axially extends from the second partition wall 144 into the first space 146 has radial oil passages for lubrication between the rotor 48r and the connecting shaft 132. The connecting shaft 132 has an oil passage formed along its centerline, for lubrication of its end portion at which the connecting shaft 132 rotatably engages the input shaft 134. An oil seal is provided between the other end portion of the connecting shaft 132 and the rotor 48r. In the present hybrid drive system 130, the resolver 118 is disposed in the second space 150 (first motor space).

The second casing member 142 has an end portion which extends beyond the third partition wall 148 toward the second motor/generator 44. This end portion cooperates with a cover 152 to define a third space 154 (second motor space) in which are accommodated the rotor 44r and stator of the second motor/generator 44 and the resolver 104. The cover 152 is bolted to the end portion of the second casing member 142. The stator of the second motor/generator 44 is fixed to the second casing member 142, while the rotor 44r is supported by the third partition wall 148 and the cover 152 via a pair of ball bearings, such that the rotor 44r is freely rotatable about its axis. This arrangement facilitates inspection of the second motor/generator 44 for its performance.

The hybrid drive system 130 of the present second embodiment has substantially the same advantages as the hybrid drive system 40 of the first embodiment. In the second embodiment, the first motor/generator 48 and the second motor/generator 44 are disposed relatively adjacent to each other, and are isolated from each other by the third partition wall 148, which partially define the first and second motor spaces 150, 154. The present arrangement makes it possible to reduce the axial dimension of the hybrid drive system 130.

Figure 11:
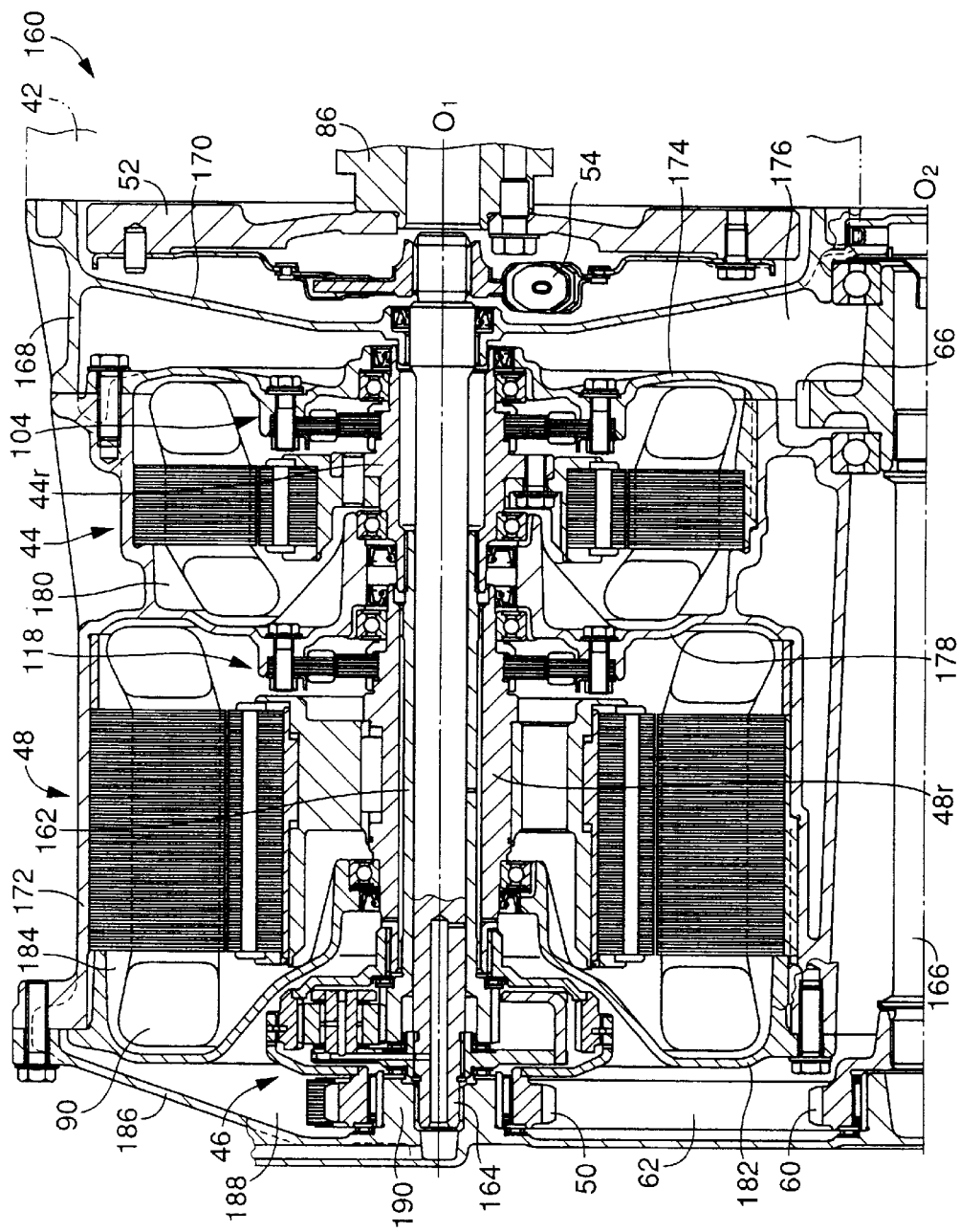
FIGS. 11 and 12 are developed cross sectional views showing in detail the construction of a hybrid drive system according to a third embodiment of the invention.
Figure 12:
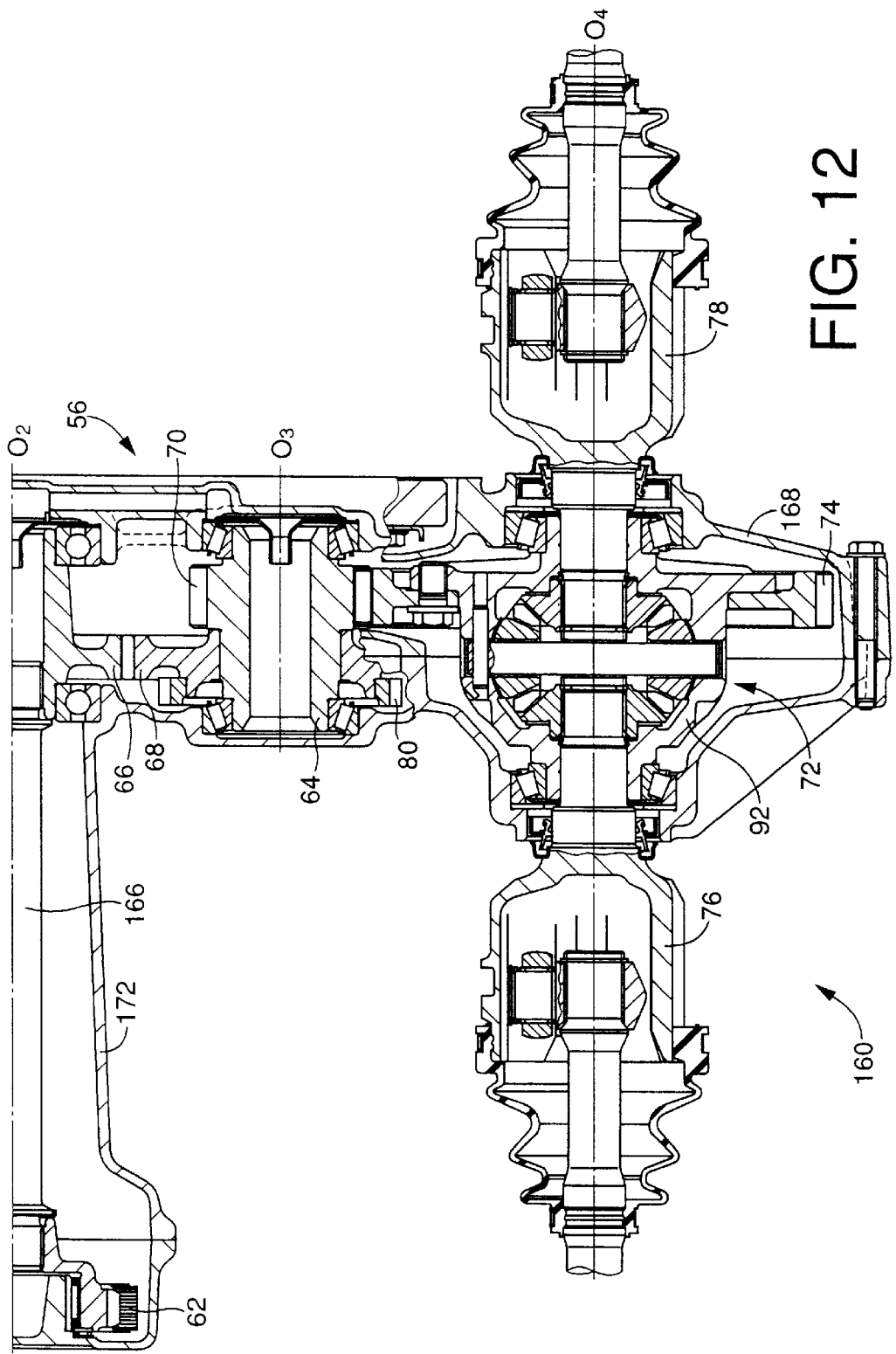
Figure 13:
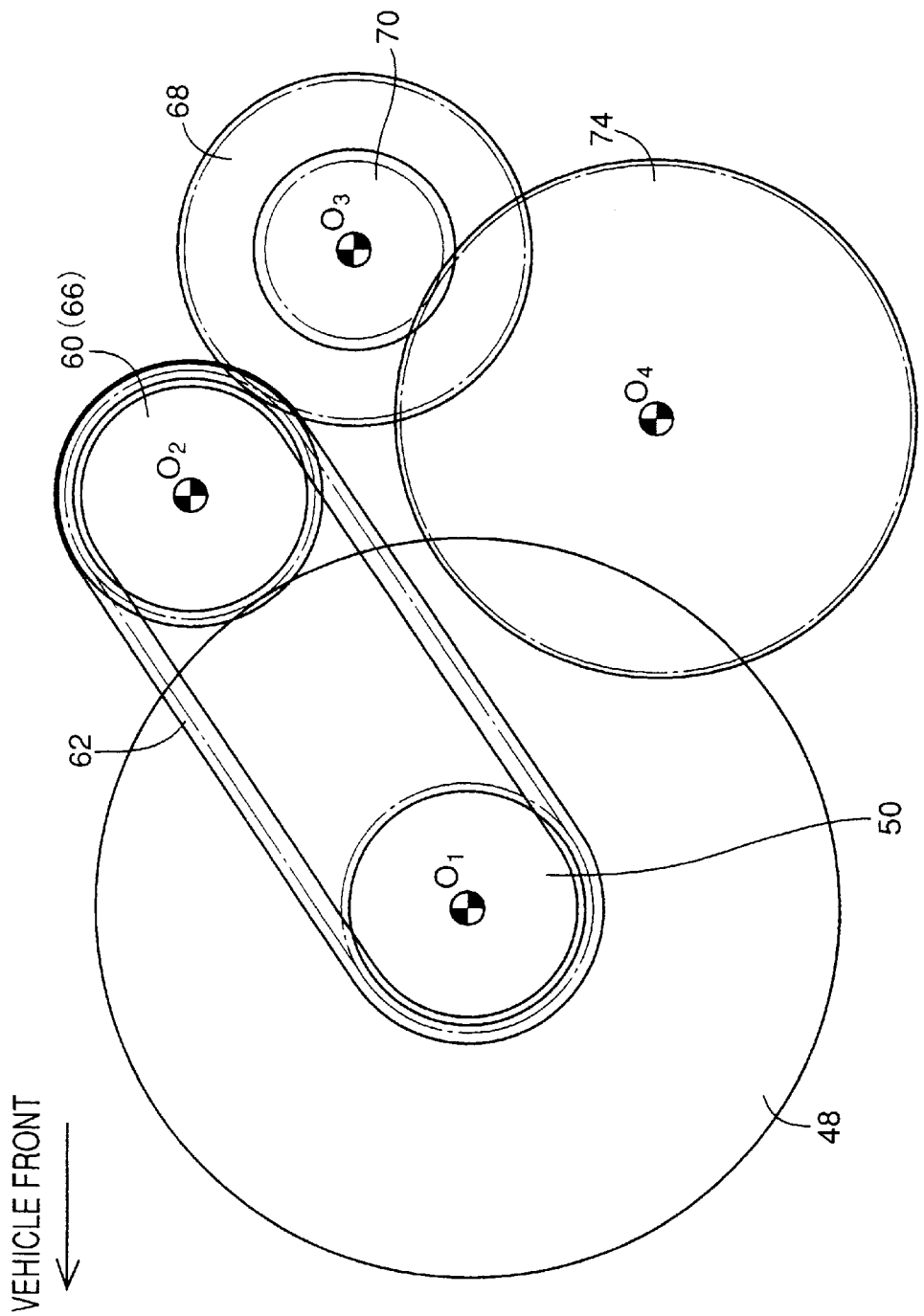
FIG. 13 is a schematic side elevational view of the hybrid drive system of FIGS. 11 and 12, showing a positional relationship of four axes O1–O4 of the system.

Reference is now made to FIGS. 11–13 corresponding to FIGS. 2, 3 and 5, there is shown a hybrid drive system 160 constructed according to a third embodiment of this invention. Like the hybrid drive system 40, the hybrid drive system 160 includes the engine 42, flywheel 52, damper 54, second motor/generator 44, first motor/generator 48, planetary gear mechanism 46, sprocket 50, speed reducing mechanism 56 and differential gear device 72, which are connected to each other as described above with respect to the first embodiment. However, the positional relationship of these elements (except the device 72) along the first axis O1 in this third embodiment is different from that in the first embodiment.

As in the hybrid drive systems 40 and 130 of the first and second embodiments, the planetary gear mechanism 46 is disposed in a radially inner space provided radially inwardly of the stator coil 90 which extends axially of the first motor/generator 48, and the sprocket 50 is disposed on one side of the planetary gear mechanism 46 remote from the first motor/generator 48. However, the second motor/generator 44 is disposed on one side of the first motor/generator 48 which is remote from the planetary gear mechanism 46, while the second motor/generator 44 is disposed between the first motor/generator 48 and the engine 42, more precisely, between the first motor/generator 48 and the flywheel 52 (damper 54). That is, the engine 42, flywheel 52, damper 54, second motor/generator 44, first motor/generator 48, planetary gear mechanism 46, and sprocket 50 are axially arranged in the order of description along the first axis O1, such that these elements are disposed adjacent to each other. It is noted that the first motor/generator 48 and the second motor/generator 44 are axially spaced apart from each other.

The rotor 44r of the second motor/generator 44 is splined to one end portion of a connecting shaft 162, so that the rotor 44r and the connecting shaft 162 are rotated together. The connecting shaft 162 extends through the bore of the rotor 48r of the first motor/generator 48, such that the connecting shaft 162 is rotatable relative to the rotor 48r. The sun gear 46s of the planetary gear mechanism 46 is formed integrally with the other end portion of the connecting shaft 162. An input shaft 164 extends through the connecting shaft 162 and the rotor 48r, such that the input shaft 164 is rotatable relative to the connecting shaft 162 and the rotor 48r. The radially inner member of the damper 54 is splined to one end portion of the input shaft 164 so that the damper 54 and the input shaft 164 are rotated together. The carrier 46c of the planetary gear mechanism 46 is splined to the other end portion of the input shaft 164, so that the carrier 46c and the input shaft 164 are rotated together.

In the planetary gear mechanism 56 in the hybrid drive system 160, the driven sprocket 60 and the speed reduction gear 66 are axially spaced apart from each other, and are connected to each other by a relatively long first intermediate shaft 166. Described in detail, the sprocket 50 is positioned at one end of the first axis O1 remote from the engine 42, while the speed reduction gears 66, 68 and the differential gear device 72 are located radially outwardly of the second motor/generator 44 and damper 54 which have relatively small diameters. This arrangement is effective to reduce the axial dimension of the hybrid drive system 160. To this end, the first intermediate shaft 166 has a relatively large length, so that the output of the sprocket 50 is transferred to the differential gear device 72 located at the position of the second motor/generator 44.

The damper 54 and the second motor/generator 44 are isolated from each other by a first partition wall 170 formed integrally with a first casing member 168, which is fixed to the engine 42. The input shaft 164 indicated above is freely rotatably supported at one end thereof by the first partition wall 170. An oil seal is provided for fluid tightness between the input shaft 164 and the partition wall 170, to prevent leakage of the lubrication oil toward the engine 42. A second casing member 172 is fixed to the first casing member 168, and a second partition wall 174 is fixed to the second casing member 172. The first casing member 168, second casing member 172 and second partition wall 174 cooperate to define a first space 176 in which there are accommodated the speed reduction gears 66, 68 and the differential gear device 72. A suitable amount of lubrication oil is contained in the first space 176, for oil bath lubrication of the meshing gears and the bearing portions. Oil seals are provided for fluid tightness between the pair of output shafts 76, 78 and the first and second casing members 168, 172. In the present hybrid drive system 160, too, the separate parking gear 80 is fixed to the speed reduction gear 68.

The second casing member 172 has an integrally formed third partition wall 178 interposed between the second motor/generator 44 and the first motor/generator 48. The second and third partition walls 174, 178 cooperate to define a second space (first motor space) 180 in which are accommodated the rotor 44r and stator of the second motor/generator 44 and the resolver 104. The stator of the second motor/generator 44 is fixed to the second casing member 172, while the rotor 44r is freely rotatable supported by the partition walls 174, 178 via a pair of ball bearings. This arrangement facilitates inspection of the second motor/generator 44 for its performance. Oil seals are provided for fluid tightness between the rotor 44r and the partition walls 174, 178, to prevent entry of the lubrication oil from the first space 176 into the second space 180.

The second casing member 172 has an end portion which extends beyond the third partition wall 178 toward the first motor/generator 48. A fourth partition 182 is bolted to this end portion of the second casing member 172. The first motor/generator 48 is isolated from the planetary gear mechanism 46 by the fourth partition wall 182. The third and fourth partition walls 178, 182 cooperate to define a third space 184 (second motor space) in which are accommodated the rotor 48r and stator of the first motor/generator 48. The stator of the first motor/generator 48 is fixed to the second casing member 172, while the rotor 48r is freely rotatably supported by the third and fourth partition walls 178, 182 via a pair of ball bearings. This arrangement facilitates inspection of the first motor/generator 48 for its performance. Oil seals are provided for fluid tightness between the rotor 48r and the partition walls 178, 182, to prevent entry of the lubrication oil into the third space 184.

Also fixed to the end portion of the second casing member 172 is a cover 186 which is located axially outwardly of the fourth partition wall 182. This cover 186 cooperates with the fourth partition wall 182 to define a fourth space 188 in which there are accommodated the planetary gear mechanism 46, sprocket 50 and driven sprocket 60. The fourth space 188 communicates with the first space 176 through ball bearings rotatably supporting the speed reduction gear 66. A suitable amount of lubrication oil is contained in these spaces 176, 188, for oil bath lubrication of the meshing gears and the bearing portions. An annular support portion 190 is fixed to the cover 186. The sprocket 50 is mounted on the outer circumferential surface of this support portion 190 via a needle bearing such that the sprocket 50 is freely rotatable about its axis relative to the support portion. 190. The input shaft 164 which is freely rotatably supported at one end thereof by the first partition wall 170 is freely rotatably supported at the other end by the inner circumferential surface of the support portion 190.

The cover 186 and the input shaft 164 have oil passages for lubrication of the bearing portions of the input shaft 164, planetary gear mechanism 46, and mutually engaging portions of the input shaft 164 and the connecting shaft 162. Radial oil passages are formed through the axial end portion of the rotor 48r of the first motor/generator 48 which extends into the fourth space 188, so that the mutually engaging portions of the rotor 48r and the connecting shaft 162 are lubricated by the oil supplied from those oil passages. The connecting shaft 162 also have radial oil passages for lubrication.

The hybrid drive system 160 of the present third embodiment has substantially the same advantages as the hybrid drive system 160 of the second embodiment. In the third embodiment, the speed reduction gears 66, 68 and the differential gear device 72 are disposed radially outwardly of the second motor/generator 44 and the damper 54 which have the relatively small diameters. This arrangement makes it possible to reduce the radial dimension of the hybrid drive system 160, as in the first embodiment. Further, the input shaft 164 extends to reach the cover 186, and is supported at the corresponding end by the cover 186. The input shaft 164 is lubricated by the oil supplied from the oil passage formed through the cover 186. This lubrication is not influenced by a centrifugal force and does not necessarily require an oil pump.

Figure 14:
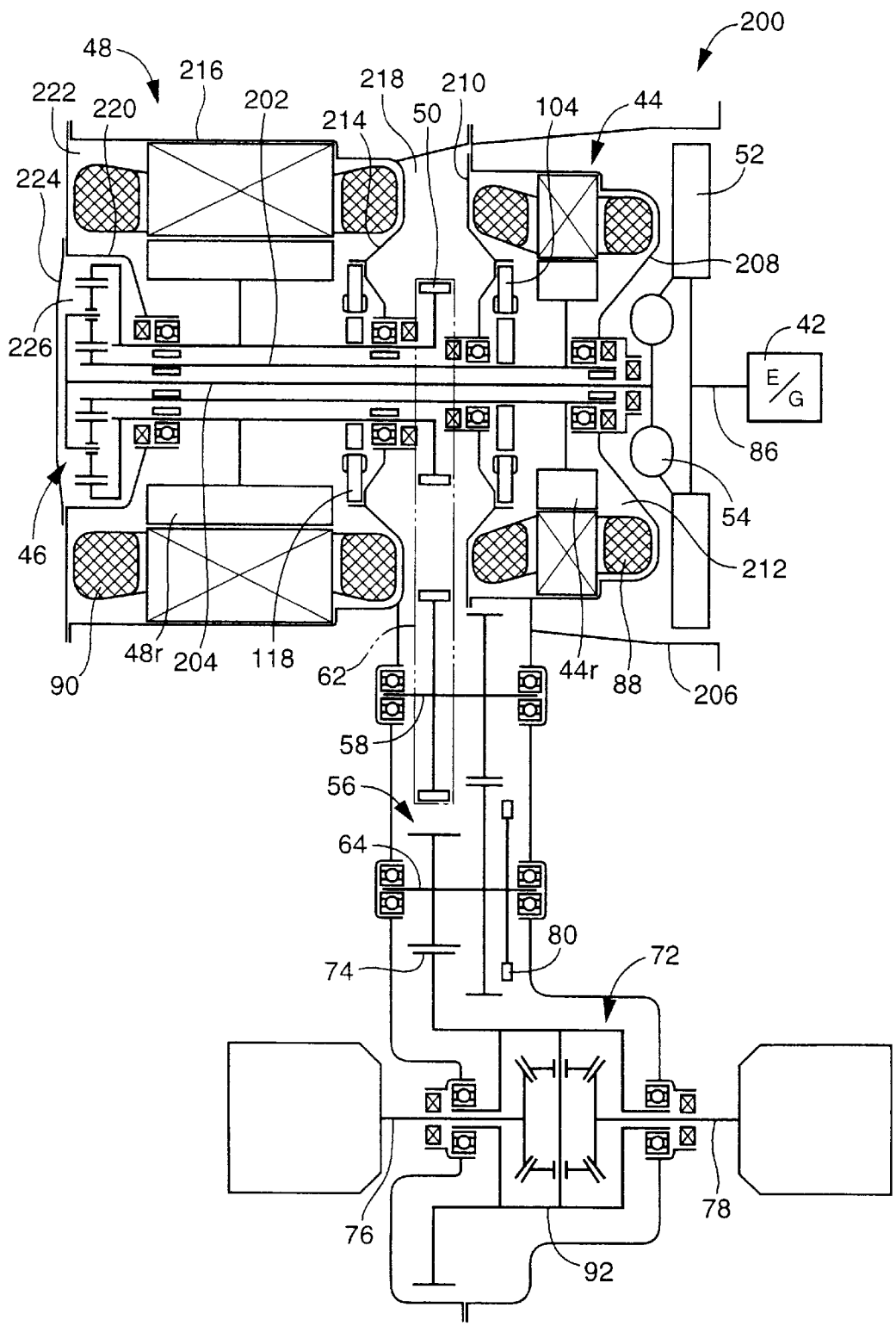
FIG. 14 is a schematic view showing a general arrangement of a hybrid drive system according to a fourth embodiment of the invention.

Referring next to FIG. 14, there is shown a hybrid drive system 200 constructed according to a fourth embodiment of this invention. Like the hybrid drive system 40 of the first embodiment, this hybrid drive system 200 includes the engine 42, flywheel 52, damper 54, second motor/generator 44, first motor/generator 48, planetary gear mechanism 46, sprocket 50, speed reducing mechanism 56 and differential gear device 72, which are connected to each other as described above with respect to the first embodiment. However, the positional relationship of these elements (except the device 72) along the first axis O1 in this fourth embodiment is different from that in the first embodiment.

In the hybrid drive system 200, the planetary gear mechanism 46 is disposed in a radially inner space provided radially inwardly of the stator coil 90 which extends axially of the first motor/generator 48 in the direction away from the engine 42. The sprocket 50 is disposed on one side of the first motor/generator 48 remote from the planetary gear mechanism 46. The second motor/generator 44 is disposed on one side of the sprocket 50 remote from the first motor/generator 48, and is interposed between the sprocket 50 and the engine 42, more precisely, between the sprocket 50 and the damper 54. The damper 54 is disposed in a radially inner space provided radially inwardly of the stator coil 88 which extends axially of the second motor/generator 44 toward the flywheel 52. Therefore, the engine 42, flywheel 52, damper 54, second motor/generator 44, sprocket 50, first motor/generator 48 and planetary gear mechanism 46 are arranged along the first axis O1 in the order of description such that these elements are disposed coaxially with and adjacent to each other. The second motor/generator 44 and the first motor/generator 48 are axially spaced apart from each other, but an axial clearance therebetween is as small as slightly larger than the width of the chain 62.

A connecting shaft 202 extends through the rotor 48r of the first motor/generator 48 and the sprocket 50 such that the connecting shaft 202 is rotatable relative to the rotor 48r and the sprocket 50. The rotor 44r of the second motor/generator 44 is splined to an end portion of the connecting shaft 202, so that the rotor 44r is rotated with the connecting shaft 202. The sun gear 46s of the planetary gear mechanism 46 is fixed to the other end portion of the connecting shaft 202, so that the sun gear 46s and the connecting shaft 202 are rotated together. An input shaft 203 extends through the connecting shaft 202 and the rotor 44r such that the input shaft 204 is rotatable relative to the connecting shaft 202 and the rotor 44r. The radially inner portion of the damper 54 is connected to an end portion of the input shaft 204, so that the damper 54 is rotated with the input shaft 204. The carrier 46c of the planetary gear mechanism 46 is connected to the other end portion of the input shaft 204, so that the carrier 46c and the input shaft 204 are rotated together.

The damper 54 and the second motor/generator 44 are isolated from each other by a first partition wall 208 formed integrally with a first casing member 206 which is fixed to the engine 42. A second partition wall 210 is fixed to the first casing member 206, and cooperates with the first partition wall 208 to define a first space 212 (first motor space) in which there are accommodated the rotor 44r and stator of the second motor/generator 44. The stator of the second motor/generator 44 is fixed to the first casing member 206, while the rotor 44r (connecting shaft 202) is freely rotatably supported by the first and second partition walls 208, 210 via ball bearings. This arrangement facilitates inspection of the second motor/generator 44 for its performance. Oil seals are provided for fluid tightness between the rotor 44r and the partition walls 208, 210, to prevent entry of the lubrication oil into the first motor space 212. An input shaft 204 is freely rotatably supported at one end portion thereof by the first partition wall 208. An oil seal is provided for fluid tightness between the input shaft 204 and the partition wall 208, to prevent leakage of the lubrication oil supplied between the input shaft 204 and the rotor 44r and connecting shaft 202. The resolver 104 indicated above is disposed in the first motor space 212, at a position radially inwardly of the stator coil 88 which axially extends toward the sprocket 50.

A second casing member 216 having an integrally formed third partition wall 214 is fixed to the first casing member 206. The second and third partition walls 210, 214 define a second space 218 in which there are accommodated the sprocket 50, speed reducing mechanism 56 and differential gear device 72. A suitable amount of lubrication oil is accommodated in the second space 218, for oil bath lubrication of the mutually meshing gears and the bearing portions. Oil seals are provided for fluid tightness between the pair of output shafts 76m 78 and the first and second casing members 206, 216, to prevent leakage of the lubrication oil from the second space 218.

The sprocket 50 and the first motor/generator 48 are isolated from each other by the third partition wall 214, while the first motor/generator 48 and the planetary gear mechanism 46 are isolated from each other by a fourth partition wall 220 which is fixed to the second casing member 216. The third and fourth partition walls 214, 220 cooperate to define a third space 222 (second motor space) in which are accommodated the rotor 48r and stator of the first motor/generator 48. The stator of the first motor/generator 48 is fixed to the second casing member 216, while the rotor 48r is freely rotatably supported by the partition walls 214, 220 via a pair of ball bearings. This arrangement permits easy inspection of the first motor/generator 48 for its performance. Oil seals are provided for fluid tightness between the rotor 48r and the partition walls 214, 220, to prevent entry of the lubrication oil into the second motor space 222. To the fourth partition wall 220, there is fixed a cover 224. The fourth partition wall 220 and the cover 224 cooperate to define a fourth space 226 in which is accommodated the planetary gear mechanism 46. A suitable amount of lubrication oil is accommodated in this fourth space 226, for oil bath lubrication of the meshing gears and bearing portions of the planetary gear mechanism 46. The resolver 118 indicated above is disposed in the second motor space 222, at a position radially inwardly of the stator coil 90 which axially extends toward the sprocket 50.

The hybrid drive system 200 of this fourth embodiment of the invention has substantially the same advantages of the hybrid drive system 40 of the first embodiment.

Figure 15:
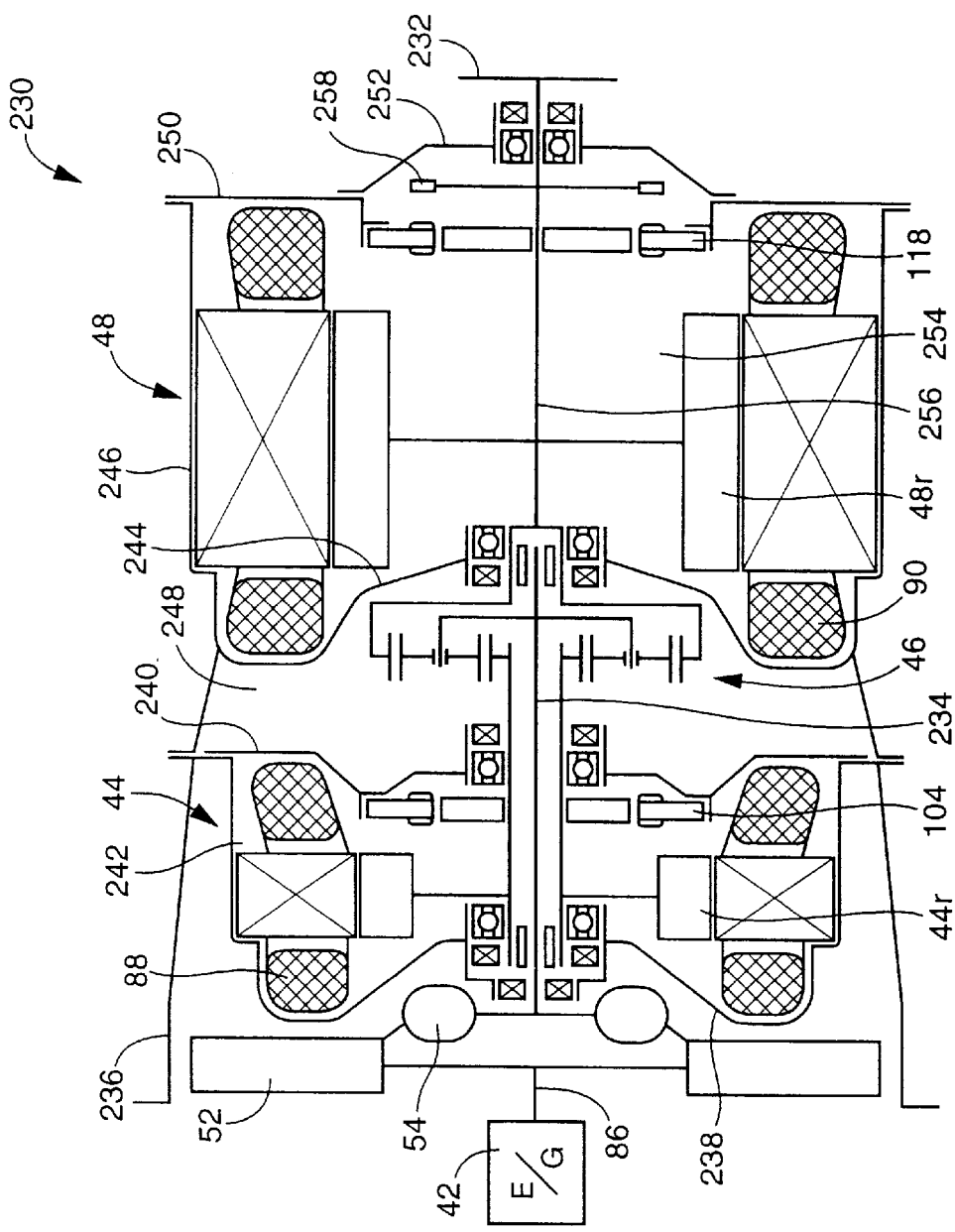
FIG. 15 is a schematic view showing a general arrangement of a hybrid drive system according to a fifth embodiment of the invention.

Referring to FIG. 15, there is shown a hybrid drive system 230 constructed according to a fifth embodiment of the invention. Like the hybrid drive system 40 of the first embodiment, the hybrid drive system 230 includes the engine 32, flywheel 52, damper 54, second motor/generator 44, first motor/generator 48, and planetary gear mechanism 46, which are connected to each other as described above with respect to the first embodiment. However, the positional relationship of these elements along the first axis O1 in this fifth embodiment is different from that in the first embodiment. Further, the hybrid drive system 230 is adapted for use on a front-engine rear-drive vehicle (FR vehicle). In the hybrid drive system 230, an output member to be connected to the propeller shaft of the FR vehicle is disposed on the first axis O1, in place of the sprocket 50.

Described in detail, the planetary gear mechanism 46 is disposed in a radially inner space provided radially inwardly of the stator coil 90 which extends axially of the first motor/generator 48 having the relatively large diameter. The output member 232 is disposed on one side of the first motor/generator 48 remote from the planetary gear mechanism 46. The second motor/generator 44 is disposed on one side of the planetary gear mechanism 46 remote from the first motor/generator 48. That is, the planetary gear mechanism 46 is interposed between the second motor/generator 44 and the first motor/generator 48. The engine 42 is disposed on one side of the second motor/generator 44 remote from the planetary gear mechanism 46. The damper 54 is disposed n a radially inner space provided radially inwardly of the stator coil 88 which extends axially of the second motor/generator 44 toward the engine 42. Thus, the engine 42, flywheel 52, damper 54, second motor/generator 44, planetary gear mechanism 46, first motor/generator 48 and output member 232 are arranged along the first axis O1 in the order of description such that these elements are disposed coaxially with and adjacent to each other. The first motor/generator 48 and the second motor/generator 44 are axially spaced apart from each other.

An input shaft 234 extends through the second motor/generator 44 such that the input shaft 234 is rotatable relative to the second motor/generator 44. The radially inner member of the damper 54 is splined to one end portion of the input shaft 234 so that the damper 54 is rotated with the input shaft 234. The carrier 46c of the planetary gear mechanism 46 is connected to the other end portion of the input shaft 234 so that the carrier 46c and the input shaft 234 are rotated together. A first casing member 236 is fixed to the engine 42, and has an integrally formed first partition wall 238. The damper 54 and the second motor/generator 44 are isolated from each other by art the first partition wall 238. A second partition wall 240 is fixed to the first casing member 236. The first and second partition walls 238, 240 cooperate to define a first space (first motor space) 242 in which are accommodated the rotor 44r and stator of the second motor/generator 44. The stator of the second motor/generator 44 is fixed to the first casing member, while the rotor 44r is freely rotatably supported by the partition walls 238, 240 via a pair of ball bearings. This arrangement facilitates inspection of the second motor/generator 44 for its performance. Oil seals are provided for fluid tightness between the rotor 44r and the partition walls 238, 240, to prevent entry of the lubrication oil into the first motor space 242. The input shaft 234 is freely rotatably supported at one end portion thereof by the partition wall 238. An oil seal is provided for fluid tightness between the input shaft 234 and the partition wall 238, to prevent leakage of the lubrication oil supplied between the input shaft 234 and the rotor 44r, The resolver 104 indicated above is disposed in the first motor space 242, at a position radially inwardly of the stator coil 88 which axially extends toward the planetary gear mechanism 46.

A second casing member 246 having an integrally formed third partition wall 244 is fixed to the first casing member 236. The second and third partition walls 240, 244 cooperate to define a second space 248 in which there is accommodated the planetary gear mechanism 46. A suitable amount of lubrication oil is accommodated in the second space 248, for oil bath lubrication of the mutually meshing gears and bearing portions of the planetary gear mechanism 46. The planetary gear mechanism 46 and the first motor/generator 48 are isolated from each other by the third partition wall 244. A fourth partition wall 250 and a cover 252 are fixed to the second casing member 246, and cooperate with the third partition wall 244 to define a third space (second motor space) 254 in which there are accommodated the rotor 48r and stator of the first motor/generator 48. The stator of the first motor/generator 48 is fixed to the second casing member 246, while a rotor shaft 256 of the rotor 48r is freely rotatably supported by the third partition wall 244 and the cover 252 via a pair of ball bearings. This arrangement facilitates inspection of the first motor/generator 48 for its performance. Oil seals are provided for fluid tightness between the rotor shaft 256 and the partition wall 244 and cover 252, to prevent entry of the lubrication oil into the second motor space 254. This output member 232 indicated above is formed integrally with one end portion of the rotor shaft 256 which extends through the cover 252 in the outward direction away from the cover 252. The resolver 118 indicated above is disposed in the second motor space 254, at a position radially inwardly of the stator coil 90 which extends axially toward the output member 232. A separate parking gear 258 of a mechanical parking mechanism is fixed to the rotor shaft 256.

Thus, the principle of the present invention is equally applicable to a hybrid drive system for use on a front-engine rear drive motor vehicle. The fifth hybrid drive system 230 of the fifth embodiment has substantially the same advantages as the hybrid drive system 40 of the first embodiment, except for the advantages of the sprocket 50 and the differential gear device 72.

Figure 16:
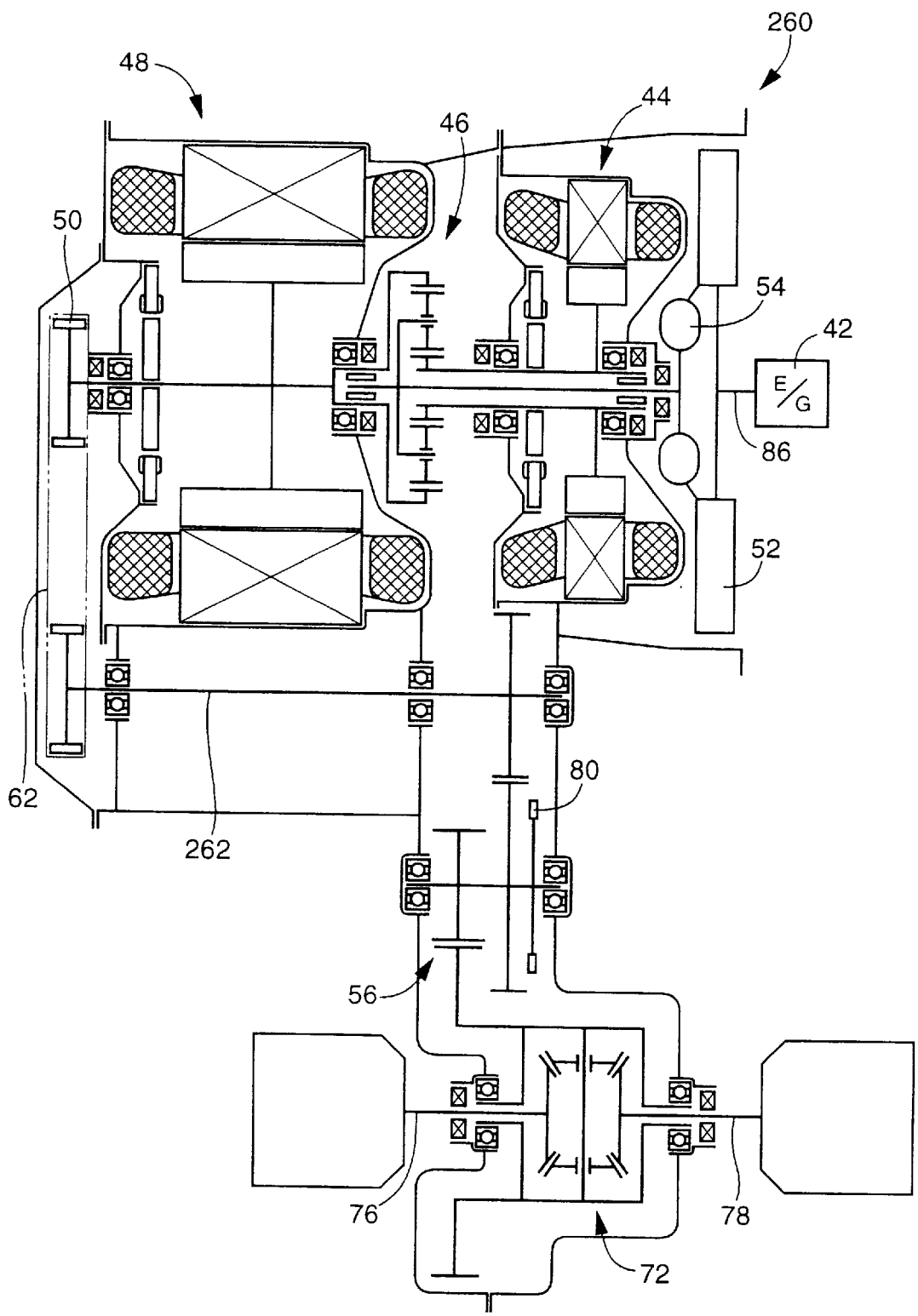
FIG. 16 is a schematic view showing a general arrangement of a hybrid drive system according to a sixth embodiment of the invention.

Referring to FIG. 16, there is shown a hybrid drive system 260 constructed according to a sixth embodiment of this invention. This hybrid drive system 260 is adapted to be disposed such that the axes O1–O4 are parallel to the transverse direction of a motor vehicle, as in a front-engine front-drive vehicle (FF vehicle). As in the hybrid drive system 160 of the third embodiment of FIGS. 11–13, the sprocket 50 is provided (in place the output member 232 used in the fifth embodiment of FIG. 15), and the output of the sprocket 50 is transferred through a first intermediate shaft 262 to the speed reducing mechanism 56 and the differential gear device 72 which are disposed radially outwardly of the second motor/generator 44 having the relatively small diameter. Like the first intermediate shaft 166 used in the embodiment of FIGS. 11–13, the first intermediate shaft 262 has a relatively large length. The present hybrid drive system 260 has substantially the same advantages as the hybrid drive system 160 of FIGS. 11–13.

Figure 17:
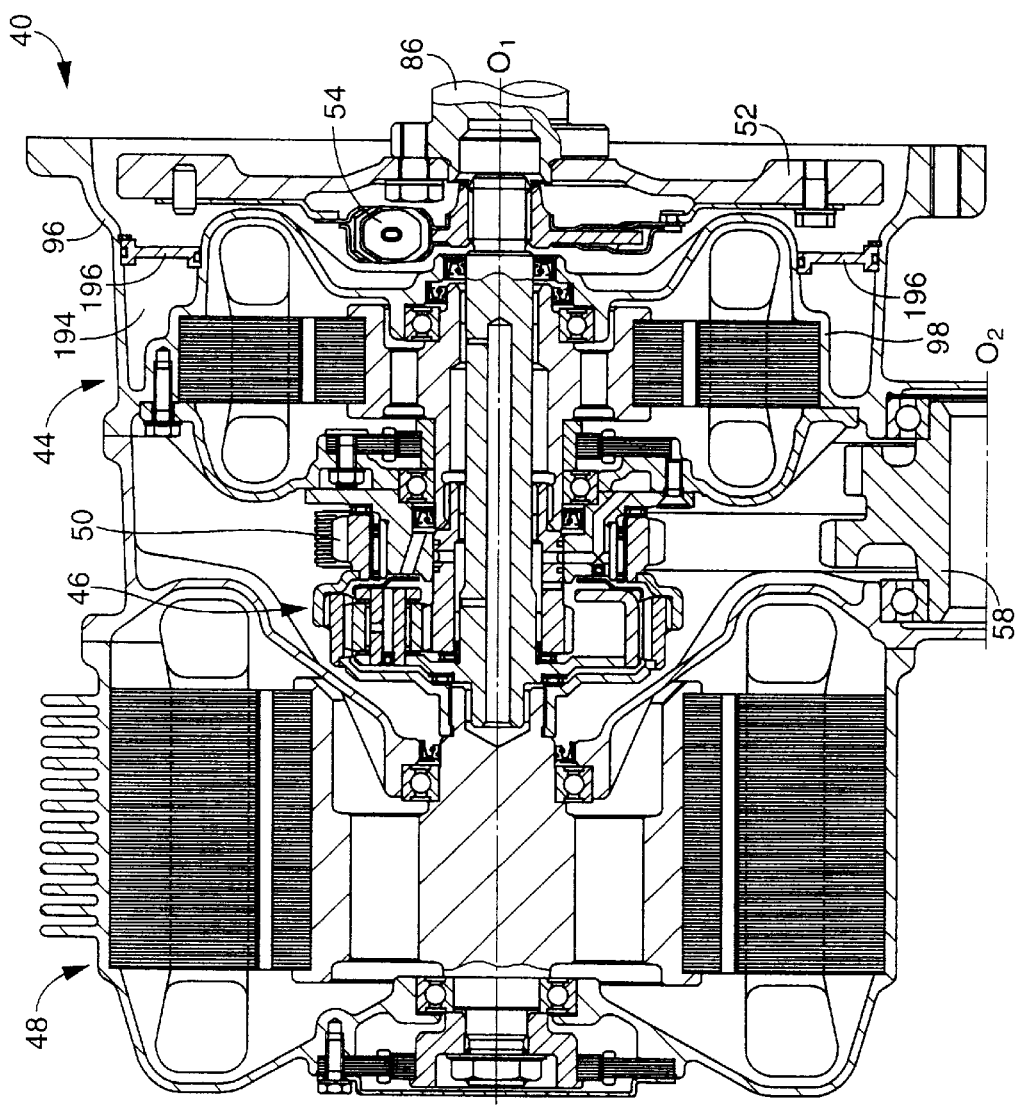
FIG. 17 is a cross sectional view corresponding to that of FIG. 2, showing a modified arrangement of the hybrid drive system of FIGS. 1–6, wherein a casing member is formed with a cooling passage.

Referring to FIG. 17, there is shown a modification of the hybrid drive system 40 of the first embodiment, wherein an annular lid member 196 is fixed by suitable means such as a retainer ring, to a portion of the first casing member 96 which is radially outward of the second motor/generator 44. This annular lid member 196 cooperates with the first partition 98 to define a cooling channel 194 through which a coolant is circulated to cool the second motor/generator 44. Similar cooling channel may be provided in the other embodiments of the invention which have been described.

In the embodiments of FIGS. 14, 16 and 17, too, the ring gear 74 which is the input member of the differential gear device 72 has a radially outer portion which overlaps the radially outer portion of the first motor/generator 48 in the radial direction.

While the several presently preferred embodiments of the present invention have been described above in detail by reference to the accompanying drawings, it is to be understood that the present invention is not limited to the details of the illustrated embodiments, but may be embodied with various changes, modifications and improvements, which may occur to those skilled in the art, in the light of the foregoing teachings.

What is claimed is:

1. A hybrid drive system for a motor vehicle, comprising (a) an engine operated by combustion of a fuel, (b) a planetary gear mechanism having a sun gear and a carriers one of which is connected to said engine, a ring gear connected to an output member, and (c) a first motor/generator connected to said out put member, and wherein said first motor/generator, said planetary gear mechanism and said output member are arranged coaxially with each other along a first axis, wherein the improvement comprises:

said first motor/generator having a stator and a stator coil which axially extends beyond an end of the stator to form a radially inner space provided radially inwardly of said stator coil, said planetary gear mechanism being disposed in said radially inner space and radially adjacent to said stator coil and being isolated from said stator and said stator coil of said first motor/generator by a partition wall; and a differential gear device which receives a drive force from said output member and distributes the received drive force to right and left drive wheels of the motor vehicle, said differential gear device including a pair of output shafts disposed along a second axis substantially parallel to said first axis, and an input member which is substantially aligned with said output member in an axial direction of said output shafts, wherein said input member is aligned with said output member in an axial direction of an intermediate rotary member.

2. A hybrid drive system according to claim 1, wherein said output member is disposed on a side of said planetary gear mechanism which is opposite to side of said planetary gear mechanism facing said first motor/generator.

3. A hybrid drive system according to claim 2, further comprising a second motor/generator disposed on said first axis, and wherein the other of said sun gear and said carrier of said planetary gear mechanism is connected to said second motor/generator.

4. A hybrid drive system according to claim 1, wherein said output member is disposed on one side of said first motor/generator which is remote from said planetary gear mechanism.

5. A hybrid drive system according to claim 4, further comprising a second motor/generator disposed on said first axis, and wherein the other of said sun gear and said carrier of said planetary gear mechanism is connected to said second motor/generator.

6. A hybrid drive system according to claim 3, wherein said second motor/generator is disposed on one side of said output member which is remote from said planetary gear mechanism, and said engine is disposed on one side of said second motor/generator which is remote from said output member.

7. A hybrid drive system according to claim 3, wherein said second motor/generator is disposed on one side of said first motor/generator which is remote from said planetary gear mechanism, and said engine is disposed on one side of said output member which is remote from said planetary gear mechanism.

8. A hybrid drive system according to claim 3, wherein said second motor/generator is disposed on one side of said first motor/generator which is remote from said planetary gear mechanism, and said engine is disposed on one side of said second motor/generator which is remote from said first motor/generator.

9. A hybrid drive system according to claim 5, wherein said second motor/generator is disposed on one side of said output member which is remote from said first motor/generator, and said engine is disposed on one side of said second motor/generator which is remote from said planetary gear mechanism.

10. A hybrid drive system according to claim 1, further comprising a second motor/generator disposed on one side of said output member on said first axis, and wherein the other of said sun gear and said carrier of said planetary gear mechanism is connected to said second motor/generator, said engine having an output shaft, and a damper connected to said output shaft, said second motor/generator having a stator coil which axially extends toward said engine such that a radially inner space is provided radially inwardly of said stator coil of said second motor/generator, said damper being disposed in said radially inner space provided radially inwardly of said stator coil of said second motor/generator, said hybrid drive system further comprising a partition wall which isolates said second motor/generator from said damper.

11. A hybrid drive system according to claim 1, wherein said output member consists of a sprocket which engages a chain for transmitting power therefrom.

12. A hybrid drive system according to claim 1, further comprising a second motor/generator disposed on said first axis, and wherein the other of said sun gear and said carrier of said planetary gear mechanism is connected to said second motor/generator, said first motor/generator and said second motor/generator being axially spaced apart from each other.

13. A hybrid drive system according to claim 1, wherein said input member is rotatable about said second axis by the drive force received from said output member, and said input member includes a radially outer portion which overlaps a radially outer portion of said first motor/generator in a radial direction of said input member and said first motor/generator.

14. A hybrid drive system for a motor vehicle having right and left drive wheels, comprising (a) an engine operated by combustion of a fuel, (b) a first motor/generator, (c) an output member connected to said first motor/generator, and (d) a differential gear device which receives a drive force from said output member and distributes the received drive force to said right and left drive wheels, and wherein said engine, said first motor/generator and said output member are arranged coaxially with each other along a first axis, and said differential gear device includes a pair of output shafts disposed along a second axis substantially parallel to said first axis, and an input member which is rotatable about said second axis by the drive force received from said output member, wherein the improvement comprises:

said input member having a radially outer portion which overlaps a radially outer portion of said first motor/generator, wherein said system further comprises a planetary gear mechanism and said first motor/generator has a stator coil which axially extends beyond an end of a stator of the first motor/generator to form a radially inner space provided radially inwardly of said stator coil, said planetary gear mechanism being disposed in said radially inner space and radially adjacent to said stator coil and being isolated from said stator and said stator coil by a partition wall; and a differential gear device which receives a drive force from said output member and distributes the received drive force to right and left drive wheels of the motor vehicle, said differential gear device including a pair of output shafts disposed along a second axis substantially parallel to said first axis, and an input member which is substantially aligned with said output member in an axial direction of said output shafts, wherein said input member is aligned with said output member in an axial direction of an intermediate rotary member.

15. A hybrid drive system according to claim 14, further comprising a second motor/generator disposed on said first axis, and wherein said input member is interposed between said first motor/generator and said second motor/generator in an axial direction of said input member.

16. A hybrid drive system according to claim 14, wherein said second axis is located below said first axis.

17. A hybrid drive system according to claim 14, further comprising an intermediate rotary member disposed rotatably about a third axis substantially parallel to said first axis, and wherein said input member receives the drive force from said output member through said intermediate rotary member, said third axis being located above said second axis.

18. A hybrid drive system according to claim 14, wherein said output member consists of a sprocket, the hybrid drive system further comprising a chain which engages said sprocket for transmitting the drive force from said sprocket to said input member.

19. A hybrid drive system according to claim 14, wherein the planetary gear mechanism comprises a sun gear and a carrier, one of which is connected to said engine, and a ring gear connected to said output member.

* * * * *